(12) United States Patent
Kobayashi et al.

(10) Patent No.: US 7,430,971 B2
(45) Date of Patent: Oct. 7, 2008

(54) GRAFTED SEEDLING PRODUCING APPARATUS

(75) Inventors: Ken Kobayashi, Saitama-ken (JP);
Kenta Shigematsu, Saitama-ken (JP);
Takahiro Ohkoshi, Ehime-ken (JP);
Hirokazu Muta, Ehime-ken (JP)

(73) Assignee: Iseki & Co., Ltd., Ehime-ken (JP)

( * ) Notice: Subject to any disclaimer, the term of this patent is extended or adjusted under 35 U.S.C. 154(b) by 0 days.

(21) Appl. No.: 11/746,950

(22) Filed: May 10, 2007

(65) Prior Publication Data

US 2007/0283862 A1    Dec. 13, 2007

(30) Foreign Application Priority Data

May 12, 2006    (JP)    ............................. 2006-133329

(51) Int. Cl.
*A11B 1/11*    (2006.01)
(52) U.S. Cl. ........................ 111/105; 47/1.01 P; 47/901
(58) Field of Classification Search ................. 111/105, 111/104, 100; 47/1.01 P, 901
See application file for complete search history.

(56) References Cited

FOREIGN PATENT DOCUMENTS

| JP | 7-031279 | 2/1995 |
|---|---|---|
| JP | 9-294469 | 11/1997 |
| JP | 3010775 | 12/1999 |
| JP | 3223578 | 8/2001 |
| JP | 3620201 | 11/2004 |
| JP | 2006-238805 | 9/2006 |
| JP | 2006-238806 | 9/2006 |
| JP | 2007-074930 | 3/2007 |
| JP | 2005-368268 | 7/2007 |

OTHER PUBLICATIONS

English Language Abstract of JP 5-023051.
English Language Abstract of JP 6-000027.
English Language Abstract of JP 10-243735.

(Continued)

*Primary Examiner*—Christopher J. Novosad
(74) *Attorney, Agent, or Firm*—Greenblum & Bernstein, P.L.C.

(57) ABSTRACT

The present invention is a grafted seedling producing apparatus 10 capable of rotating seedlings W in an alignment direction even if they are those having large leaves and thereafter halting the rotation to align them, or the apparatus 10 having loading portions 1, 2 which are provided with a seedling carry-in mechanism 11 for sequentially transporting a tray 7 of a large number of arranged seedlings W, a grip hand 12 for individually gripping stems of seedlings on the seedling carry-in mechanism 11, a cutter mechanism 23 for individually cutting the stems of seedlings gripped by the grip hand 12, an alignment guide 14 for aligning seedlings to be transported by the grip hand 12, a roller 17 for rotating the seedlings W to an alignment direction at the side of the seedling carry-in mechanism 11 from the alignment guide 14, and a transport mechanism 13 for moving the grip hand 12 to the alignment guide side; a retaining mechanism 15 provided with to a main alignment member 16 which regulates a direction to which the seedling leaf of a seedling W gripped by the grip hand 12 at the loading portions 1, 2 faces to the alignment guide 14 and temporarily retaining the seedlings W transported from the grip hand 12; and an attachment treatment portion 5 for attaching the seedlings W delivered from the retaining mechanism 15.

7 Claims, 20 Drawing Sheets

OTHER PUBLICATIONS

English Language Partial Translation of JP 9-294469.
English Language Partial Translation of JP 7-031279.
English Language Abstract of JP 2006-238805.
English Language Abstract of JP 2006-238806.
English Language Partial Translation of JP 2007-074930.
English Language Partial Translation of JP 2005-368268.

F I G. 1
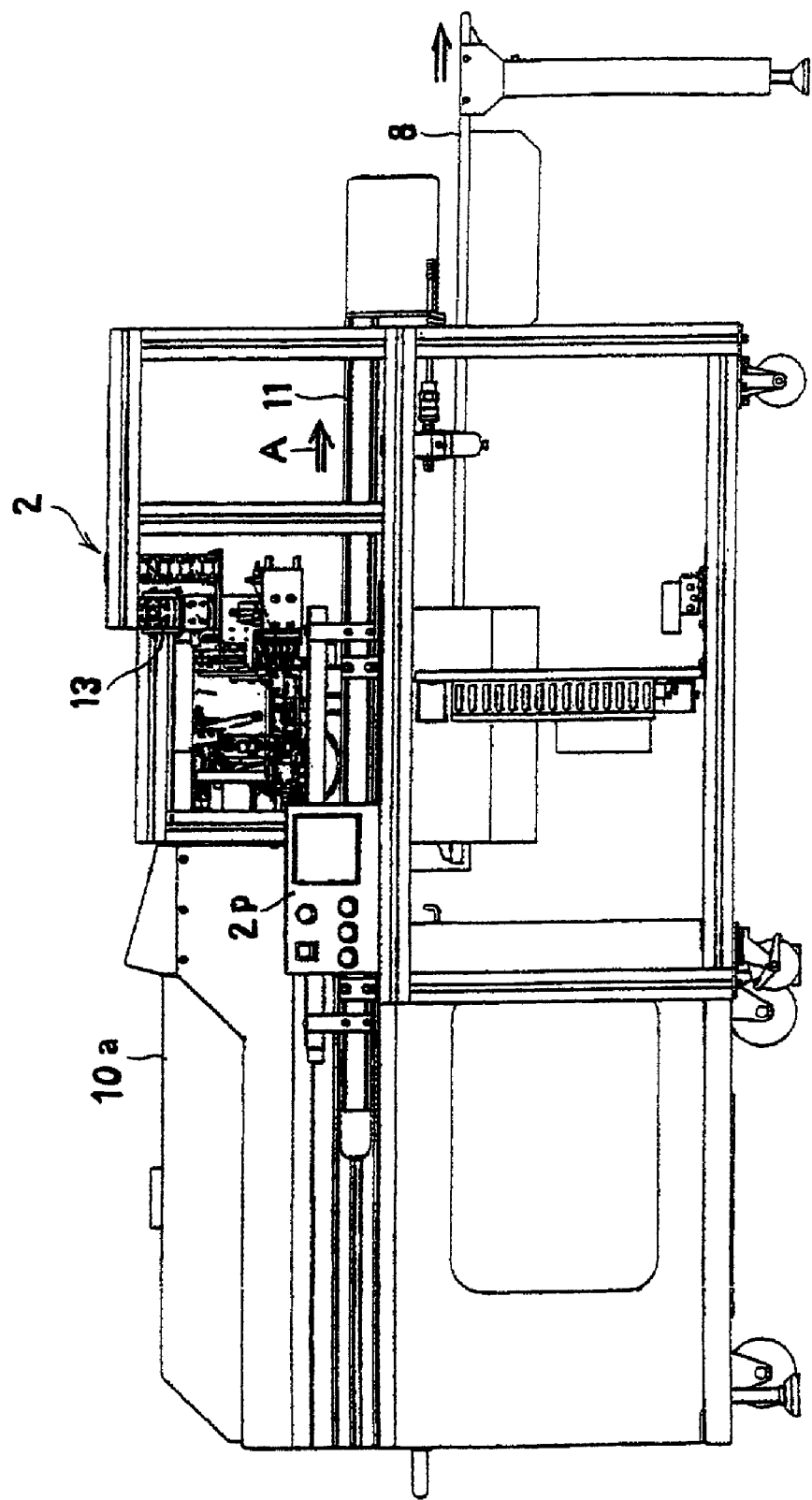

F I G . 1 6
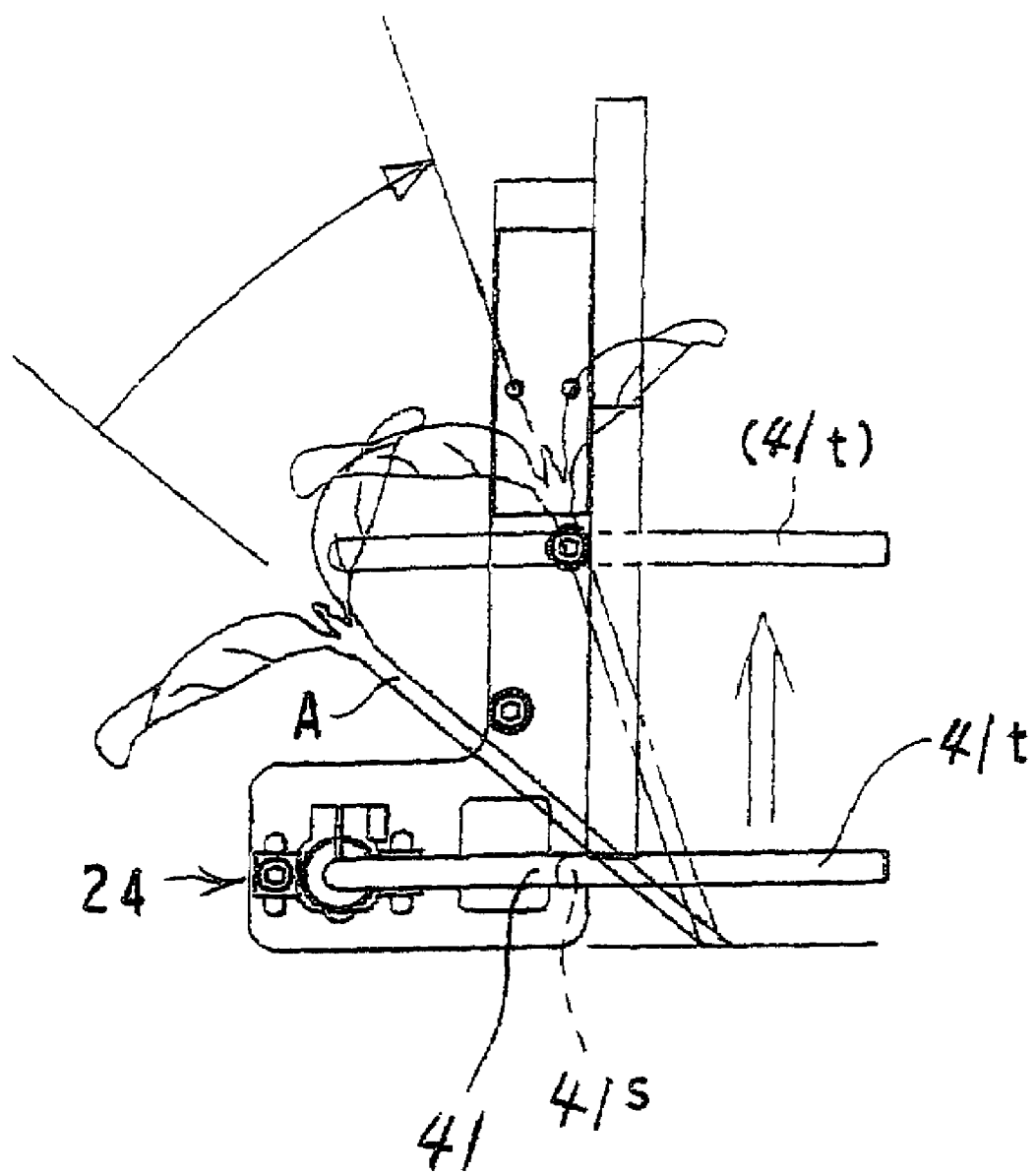

GRAFTED SEEDLING PRODUCING APPARATUS

TECHNICAL FIELD

The present invention relates to a grafted seedling producing apparatus.

BACKGROUND ART

A conventional grafted seedling producing apparatus described in Japanese Patent No. 3010775A is constituted with a rootstock transport mechanism and a scion transport mechanism arranged approximately in a symmetrical manner, an attachment mechanism arranged at a grafting position in the center of the equipment and a seedling delivery mechanism provided therebelow, that is a grafting robot for grafting a scion on a rootstock to produce a grafted seedling.

DISCLOSURE OF THE INVENTION

It is an object of the present invention to provide a grafted seedling producing apparatus capable of rotating seedlings in an alignment direction even if they are those having large leaves and thereafter halting the rotation to align them, thereby solving a problem.

The abovementioned object of the present invention is attained by the following apparatus.

That is, the first aspect of the present invention is related to a grafted seedling producing apparatus comprising;

loading portions (1, 2) which are provided with a seedling carry-in mechanism (11) for sequentially transporting a tray (7) of a large number of arranged seedlings (W), a grip hand (12) for individually gripping stems of seedlings (W) on the seedling carry-in mechanism (11), a cutter mechanism (23) for individually cutting the stems of seedlings (W) gripped by the grip hand (12), an alignment guide (14) for aligning seedlings (W) to be transported by the grip hand (12), a roller (17) for rotating the seedlings (W) to an alignment direction at the side of the seedling carry-in mechanism (11) from the alignment guide (14), and a transport mechanism (13) for moving the grip hand (12) to the alignment guide (14);

a retaining mechanism (15) which is provided with an alignment member (16) which regulates a direction to which the seedling leaf of a seedling (W) gripped by the grip hand (12) of the loading portions (1, 2) and faces to the alignment guide (14) and temporarily retains seedlings (W) transported from the grip hand (12); and an attachment treatment portion (5) for attaching seedlings (W) delivered from the retaining mechanism (15).

Therefore, in the grafted seedling producing apparatus according to the first aspect of the invention, while the tray (7) of a large number of arranged seedlings (W) on the seedling carry-in mechanism (11) is sequentially transported, the grip hand (12) individually grips the stems of seedlings (W) on the seedling carry-in mechanism (11), the cutter mechanism (23) individually cuts the stems of seedlings (W) gripped by the grip hand (12), the transport mechanism (13) moves the grip hand (12) horizontally to rotate the seedlings (W) with the roller (17), the rotation of the seedlings (W) is halted by the alignment guide (14) provided at a position immediately in front of a termination of the transport path, and the seedlings (W) are transported and retained temporarily by the retaining mechanism (15).

At this time, the alignment guide (14) in loading portions (1,2) and the alignment member (16) on the retaining mechanism (15) regulate the seedling-leaf developing direction of the seedlings (W). Then, the attachment treatment portion (5) is used to attach the seedlings (W) delivered from the retaining mechanism (15).

According to the first aspect of the invention, the following effects are provided.

Seedlings (W) are rotated in an alignment direction at first by using the roller (17) even if they are those having large leaves, and thereafter the rotation of the seedlings (W) is halted by using the alignment guide (14), thus making it possible to align the seedlings.

The second aspect of the invention is a grafted seedling producing apparatus according to claim 1, the grip hand (12) and the cutter mechanism (23) are provided to move to the transfer direction of the seedling carrying-in mechanism (11) in an integrated manner by a back and forth moving mechanism (12b) supported by the transport device (13) and are provided to moved in a perpendicular direction to the transfer direction by the transport device (13).

According to the second aspect of the invention, the back and forth moving mechanism (12b) for moving the grip hand (12) of gripping a seedling (W) to a transfer direction of the seedling carrying-in mechanism (11) and the transport device (13) for moving to a direction orthogonal to the transfer direction of the seedling carrying-in mechanism (11) is synchronized for movement, by which the seedling (W) is moved obliquely to the direction given by the arrow D in FIG. 4, thereby preventing the seedling from being entangled in the grip hand 12 or the like.

The third aspect of the invention is a grafted seedling producing apparatus according to claim 1, the hoisting tool (24) mounted on the hand grip (12) is provided with a first hoisting tool (41) and a second hoisting tool (42) on the side which is bilaterally opposite to the first hoisting tool (41) with respect to scion seedlings (W) so as to be moved back and forth by a back and forth moving cylinder (43) and to be moved up and down by using vertical movement device (19).

According to the third aspect of the invention, the second hoisting tool (42) is moved upward in association with the elevating motion of the first hoisting tool (41), making it possible to hoist seedlings (W) from both sides of the seedlings (W) and also from backward and erect them, by which the grip hand (12) can be used to grip appropriately scion seedlings (W).

The fourth aspect of the invention is a grafted seedling producing apparatus according to claim 3, the first hoisting tool (41) is constituted with a rod tilted down forward to the root of a scion seedling (W) in which the leading end portion (41t) is bent so as to reach behind from the side of the retaining mechanism (15) to which the grip hand (12) is moved laterally for taking out seedlings (W) and a side portion (41s) provided on the base of a leading end portion (41t) in a winding manner are provided approximately at a right angle and the second hoisting tool (42) is constituted with a rod provided on the side which is bilaterally opposite to the first hoisting tool (41) with respect to scion seedlings (W) in which leading end portion (42a) is bent so as to be positioned on the side of seedlings (W) on which the grip hand (12) moves laterally for taking out the seedlings (W) on the opposite side to the retaining mechanism (15), and is provided so as to be moved back and forth by a back and forth moving cylinder (43).

According to the fourth aspect of the invention, the second hoisting tool (42) is moved upward in association with the elevating motion of the first hoisting tool (41) by a vertical movement device (19), making it possible to hoist seedlings (W) from both sides of the seedlings (W) and also from backward and erect them, by which the grip hand (12) can be used to grip appropriately scion seedlings (W). In particular, the second hoisting tool (42) can prevented that a seedling (W) is entangled to an adjacent seedling (W) and transported as it is by the grip hand (12) to result in an improper gripping posture of the seedling (W). Further, such a constitution is provided that the first hoisting tool (41) is moved up and down, by which the other hoisting tool (42) is also moved up and down with vertical movement device (19). Therefore, the hoisting tools (41, 42) can be moved up and down in a simple manner. Still further, the second hoisting tool (42) is bent in such a way that a halfway portion is projected toward the grip hand (12) (the side move away from an adjacent seedling) in a plan view. Thus, the grip hand (12) can be opened or closed at a predetermined level so as not to interfere with the second hoisting tool (42) and the second hoisting tool (42) is less likely to interfere with an adjacent seedling so that seedlings (W) can be taken out smoothly.

The fifth aspect of the invention is a grafted seedling producing apparatus according to claim 1, an inclination regulating tool (44) composed of a spring-functioning thin plate having a V-shaped groove along the width of the tray (7) is provided above the tray (7) on the seedling carry-in mechanism (11), one end of the inclination regulating tool (44) being fixed only to the support wall (30a) of the support plate (30) which is provided to support the seedling carry-in mechanism (11) and the other end the inclination regulating tool (44) being not fixed to the support wall (30b) but kept free.

According to the fifth aspect of the invention, one end of the inclination regulating tool (44) is not fixed to the support wall (30b) but kept free, by which seedlings (W) are allowed to pass through the inclination regulating tool (44) even if seedlings (W) are cut to be hard and large. Thus, the work can be performed smoothly.

The sixth aspect of the invention is a grafted seedling producing apparatus according to claim 1, the alignment guide (14) is composed of a plate material (14a) having and a triangular horizontal cross section at which the plate flat face is disposed in a vertical direction and a rod-shaped guide (14b) mounted above the plate material (14a) and disposed in a vertical direction, wherein a plate material (14a) is located in the vicinity of the scion seedling transport path so as to regulate a range of the rotational movement of scion seedling leaf transported by a transport mechanism (13) and the rod-shaped member (14b) is located in the area where the rod-shaped member (14b) is directly brought into contact with scion seedling leaf when the leaf moves rotationally to an excessive extent.

According to the sixth aspect of the invention, it is possible to prevent an improper posture of seedlings or a wrong direction to which the seedling leaf spreads so that a direction to which the seedling leaf spreads is uniformly arranged substantially toward the scion seedling transport direction from a grip position (O) by the grip hand (12) to a delivery position (R) and even if a scion seedling (W) is moved rotationally to an excessive extent, the seedling leaf of the seedling (W) is brought into contact with a rod-shaped member (14b), appropriately inducing the rotation of the leaf, by which the seedlings (W) can be successfully delivered to the retaining mechanism 15.

The seventh aspect of the invention is a grafted seedling producing apparatus according to claim 1, the seedling carry-in mechanism (11) is tilted so that the portion in the forward moving direction is lower than a horizontal plain (h).

According to the seventh aspect of the invention, it is possible to prevent seedlings (W) from being entangled thereto.

BRIEF DESCRIPTION OF THE DRAWINGS

FIG. 1 is a side view illustrating major parts of a grafted seedling producing apparatus according to an embodiment of the present invention.

FIG. 16 is a front view illustrating a rising motion of the first hoisting tool of the grip hand of the grafted seedling producing apparatus in FIG. 1.

BEST MODES FOR CARRYING OUT THE INVENTION

Hereinafter, embodiments of the present invention shall be described along with the drawings.

Figure 2:
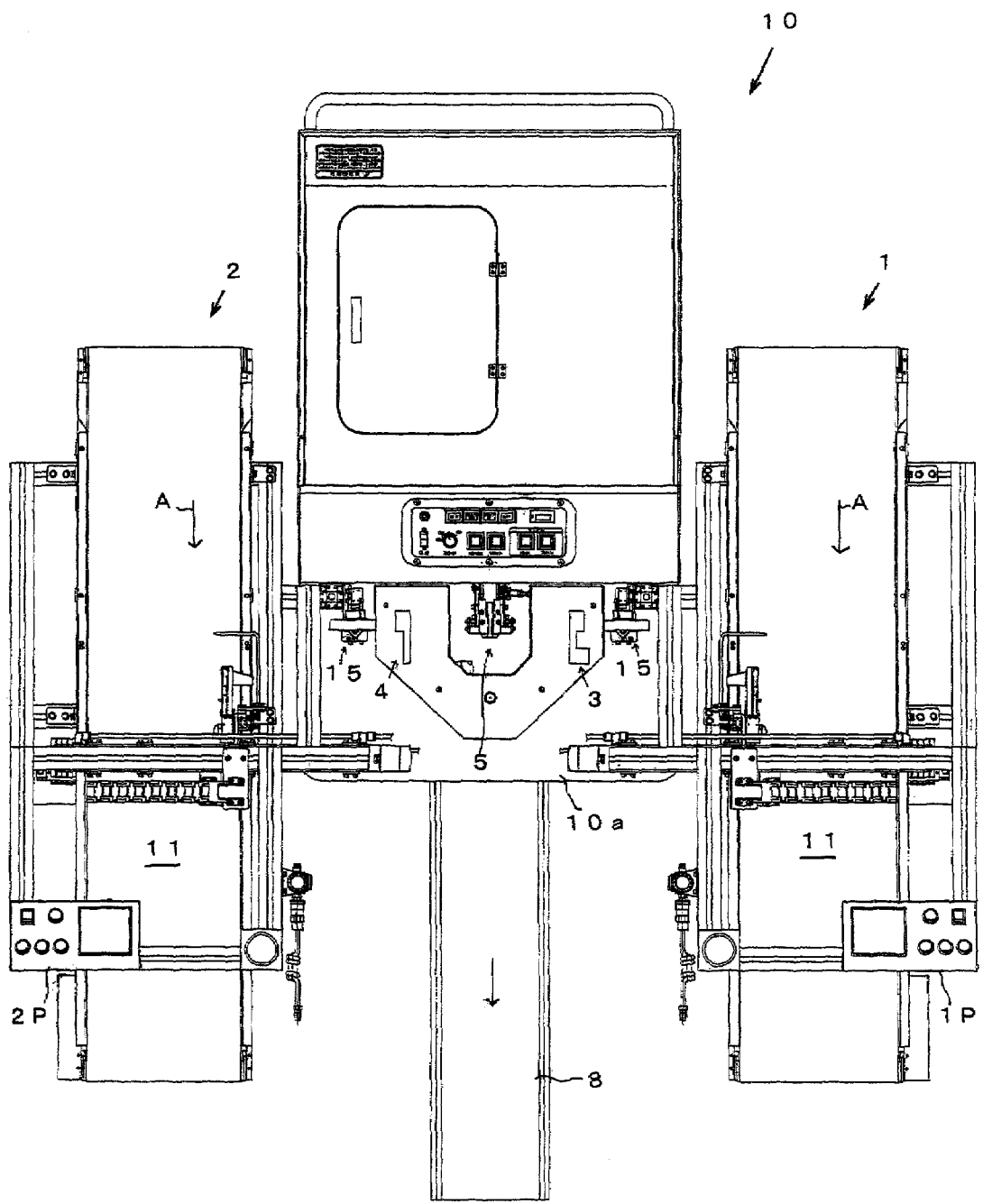
FIG. 2 is a plan view illustrating a whole structure of the grafted seedling producing apparatus in FIG. 1.

FIG. 1 and FIG. 2 are respectively a side view and a plan view illustrating major parts of a grafted seedling producing apparatus 10.

The grafted seedling producing apparatus 10 is provided with a grafting robot main body 10a for grafting a scion on a rootstock at the center, a rootstock loading portion 1 at the left thereof and a scion loading portion 2 on the right thereof. The grafting robot main body 10a is provided at either side of the front face with a rootstock prior treatment portion 3 and a scion prior treatment portion 4 which receive a rootstock and a seedling as a scion respectively from the rootstock loading portion 1 and the scion loading portion 2. It is also provided at the center with the attachment treatment portion 5 for attaching the rootstock and the scion respectively supplied from the rootstock prior treatment portion 3 and the scion prior treatment portion 4. Further, it is provided with a grafted seedling sending portion 8 disposed for sending out the thus attached grafted seedling from below. The rootstock loading portion 1 and the scion loading portion 2 in FIG. 1 and FIG. 2 correspond to the grafted seedling automatic feeder.

Figure 3:
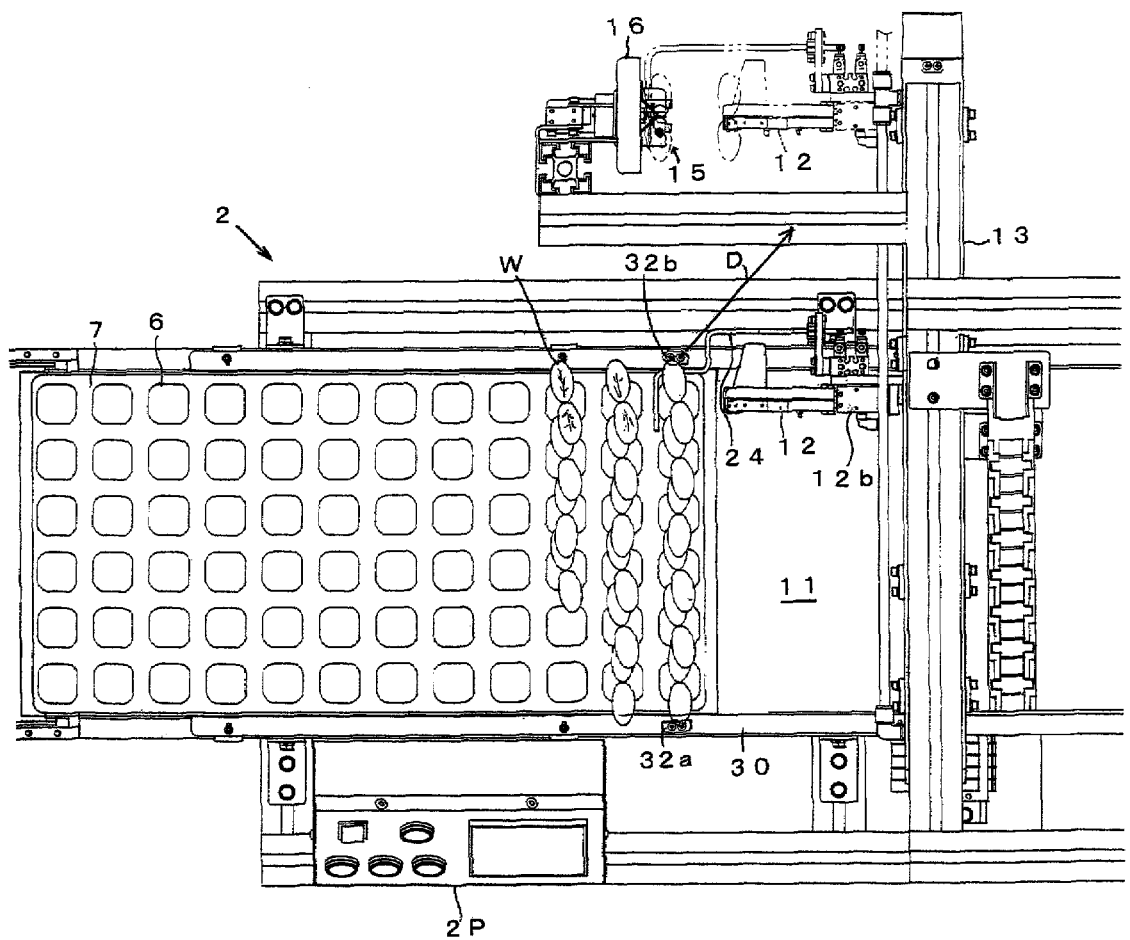
FIG. 3 is a plan view illustrating a partially-omitted loading portion of the grafted seedling producing apparatus in FIG. 1.

As described above, the grafted seedling producing apparatus 10 is constituted approximately in a symmetrical manner with the rootstock side and the scion side, and operation panels 1P and 2P are provided respectively at the front side of the rootstock loading portion 1 and the scion loading portion 2. It is noted that since the rootstock loading portion 1 and the scion loading portion 2 are constituted with respect to each other in a symmetrical manner and similarly, hereinafter, a description will be made for the scion loading portion 2 mainly by referring to the plan view of FIG. 3 and the major part enlarged view of FIG. 4.

The scion loading portion 2 is constituted with a seedling carry-in mechanism 11 for sequentially carrying and transporting a tray 7 in a lattice arrangement a large number of scion seedlings W raised inside a cell 6 on the side of the grafting robot main body 10a, a grip hand 12 for individually gripping a scion seedling W as a scion in a back and forth movable manner by a back and forth moving mechanism 12b composed of an air cylinder of moving back and forth with respect to scion seedlings W (FIG. 4) on the seedling carry-in mechanism 11, cutting the stems and gripping them, a transport mechanism 13 composed of an electrical slider which supports the grip hand 12 so as to move horizontally in a direction orthogonal to the forward moving direction of the seedling carry-in mechanism 11 (hereinafter, sometimes referred to as the lateral direction), an alignment guide 14 (refer to FIG. 6) provided on the transport path and others. Further, a retaining mechanism 15 for temporarily retaining scion seedlings W transported from the scion loading portion 2 is provided at a scion delivery position R (FIG. 4) between the scion loading portion 2 and the scion prior treatment portion 4.

The above seedling carry-in mechanism 11 is constituted with a belt conveyor moving along the side of the grafting robot main body 10a and others, sequentially effecting the transfer movement to a direction given by the arrow A (FIG. 1, FIG. 2) at the alignment pitch of the tray 7 each time the scion seedlings W inside cells 6 lined up in single array from left to right in the tray 7 are taken out, thereby carrying the scion seedlings W to a predetermined position so as to be gripped by the grip hand 12 supported by the transport mechanism 13.

Figure 5:
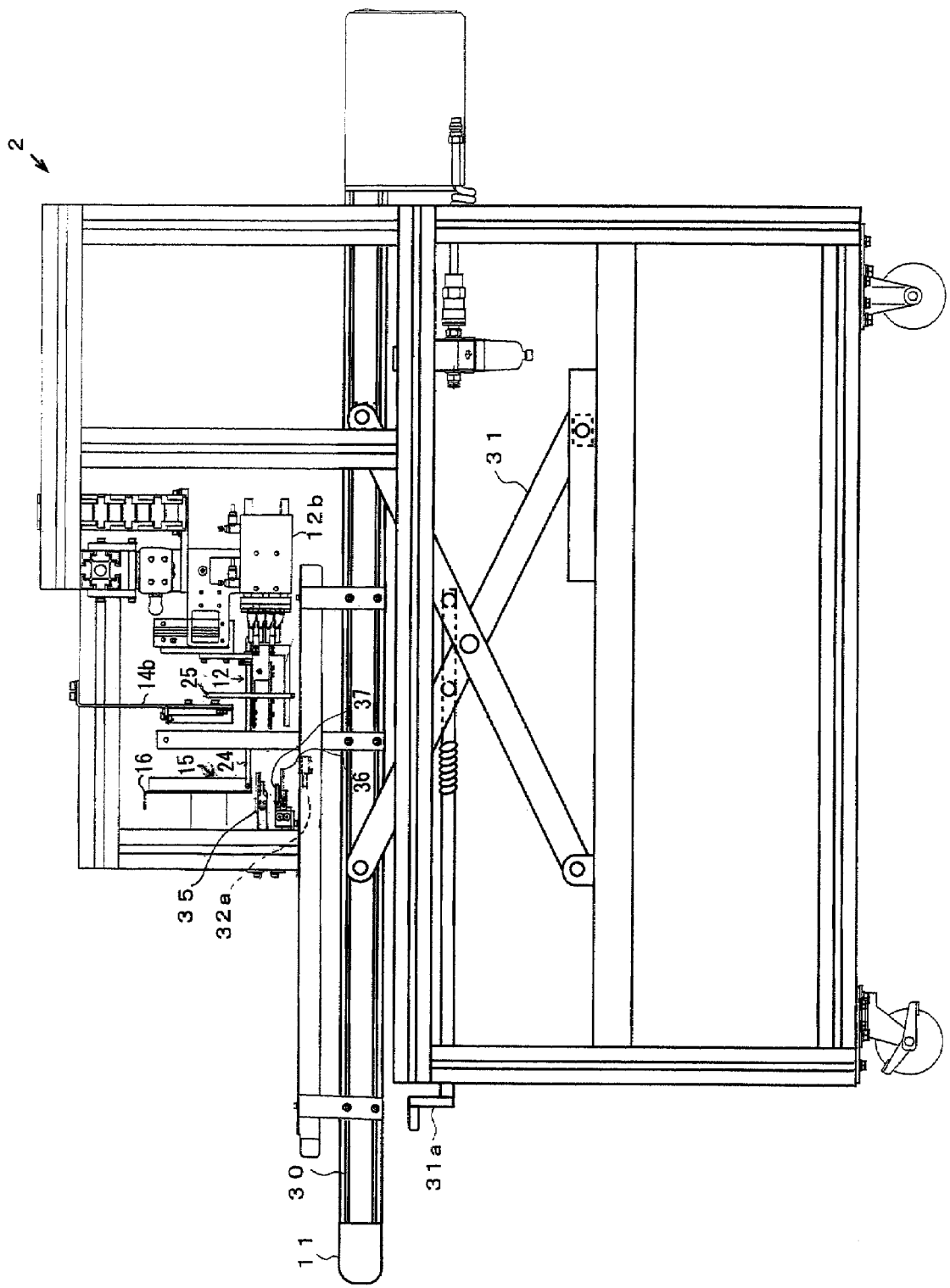
FIG. 5 is a side view illustrating a whole structure of the grafted seedling producing apparatus in FIG. 1, when viewed from a scion loading portion.

The seedling carry-in mechanism (seedling transfer belt) 11 at the scion loading portion 2 of the grafted seedling producing apparatus 10 of the present embodiment is made adjustable for the height, by which a reference of cutting and gripping seedlings can be changed. As illustrated in FIG. 5, which is a side view of the grafted seedling producing apparatus 10 taken on the side of the scion loading portion 2, a support frame 30 of the seedling transfer belt 11 at the scion loading portion 2 can be moved up and down by using a pantograph-shaped vertical-position adjusting device 31 and operating a handle 31a.

At a scion loading portion 2 of a conventional grafted seedling producing apparatus 10, a seedling is taken out on the basis of a position for cutting the seedling which is about 2 mm above the upper face of a cell 6. However, where a seedling grows large (high), the seedling is not transferred smoothly on the basis of the upper face of the cell 6, and the seedling is swung to frequently result in a poor control of the direction or height of the seedling. Therefore, as illustrated in FIG. 5, the pantograph-shaped vertical-position adjusting device 31 is used to directly adjust the height of the scion loading portion 2, thereby making it possible to easily adjust the cutting height of the seedling depending on the size of the seedling.

Further, photoelectric sensors 32a and 32b (FIG. 4) for detecting the position of the cell 6 to control the seedling transfer belt 11 and on-off of the transfer movement thereof are provided separately. More specifically, the photoelectric sensors 32a and 32b are provided on a frame 30 which can be moved up and down together with the seedling transfer belt 11, and the conveyor 11 is made in synchronization with the vertical movement of the frame 30.

In a prior art, it is impossible to move up and down the support frame of a seedling transfer belt. Further, photoelectric sensors are mounted on the seedling transfer belt. This constitution needs to move the seedling transfer belt up and down in grafting the seedling, depending on the shape of a seedling. As a result, when the photoelectric sensors are mounted above the seedling transfer belt, there is found a deviation in the halting position of a tray 7 or the gripping position of the seedling, by which adjustment is required each time depending on the shape of the seedling.

However, in the present embodiment, the photoelectric sensors 32a and 32b are provided on the frame 30 which can be moved up and down together with the seedling transfer belt 11, and the conveyor belt 11 is moved in synchronization with the vertical movement of the frame 30. Because of this constitution, even when the shape of a seedling is changed to result in deviation of the seedling transfer belt 11, there is no change in position of the photoelectric sensors 32a and 32b disposed with respect to the seedling (conveyor halting position). Therefore, the grafted seedling producing apparatus 10 is improved in applicability as compared with a conventional counterpart, thereby eliminating the necessity for adjusting the vertical movement between the photoelectric sensors 32a and 32b and the seedling transfer belt 11.

Figure 4:
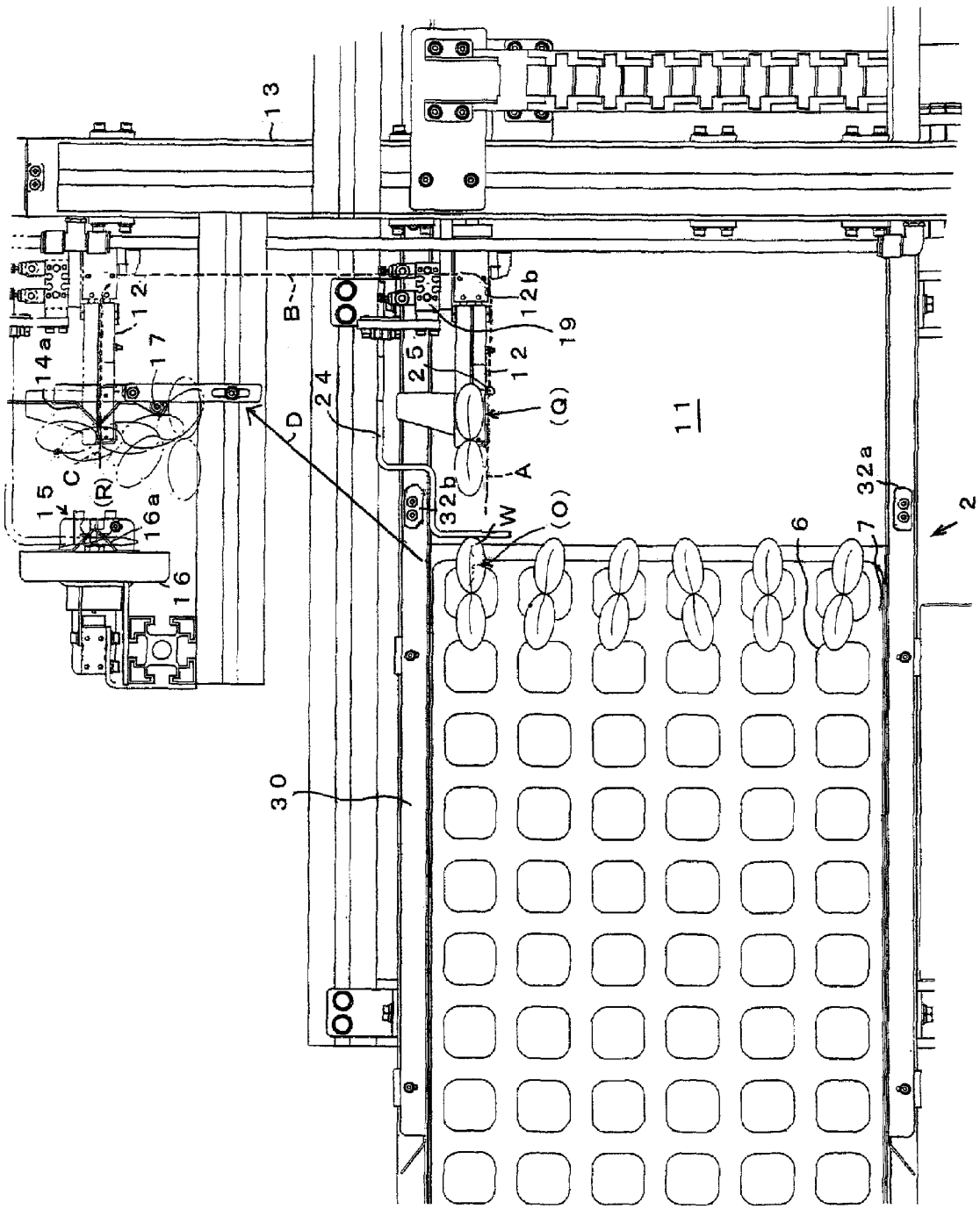
FIG. 4 is a plan view illustrating enlarged major parts of the grafted seedling producing apparatus in FIG. 1.

In the present embodiment, an air cylinder 12b supported by the transport device 13 for moving the grip hand 12 of gripping a seedling to a transfer direction of the belt conveyor 11 and the transport device 13, an electrical slider, for moving to a direction orthogonal to the transfer direction of the belt conveyor 11 is synchronized for movement, by which the seedling is moved obliquely to the direction given by the arrow D in FIG. 4, thereby preventing the seedling from being entangled in the grip hand 12 or the like.

Conventionally, as illustrated by dotted lines A, B, and C in FIG. 4, the transfer direction of a grip hand 12 and a cutter mechanism 23 for gripping and cutting a seedling (refer to FIG. 6) is expanded and contracted by using an air cylinder 12b to the transfer direction of a seedling transfer belt 11 (direction given by arrow A in FIG. 4) or to the opposite direction, thereafter, a transport device 13 is used to transport the seedling in a lateral direction (direction given by the arrow B in FIG. 4), and also transport the seedling to the delivery position R of a retaining mechanism 15 (direction given by the arrow C in FIG. 4), thereby the seedling is transported on a U-shaped track.

However, in the present embodiment, the transfer direction of the grip hand 12 and the cutter mechanism 23 for gripping and cutting a seedling is expanded and contracted by using the air cylinder 12b mounted on the grip hand 12 and the cutter mechanism 23 to the transfer direction of the seedling transfer belt 11 or to the opposite direction and also the transport device 13, an electrical slider, is moved in a lateral direction, by which the seedling can be transported in an oblique direction (direction given by the arrow D in FIG. 4).

As described above, according to the present invention, a seedling is not entangled in the grip hand 12 or the like and can be grafted in a shorter cycle time.

Further, in a return travel where the grip hand 12 moves from the delivery position R of the retaining mechanism 15 (FIG. 4) to the tray 7 on the seedling transfer belt 11 in an attempt to grip a subsequent seedling, the grip hand 12 is moved horizontally at a normally faster transport speed. A hoisting tool 24 mounted from side to side outside the grip hand 12 and moving upward on gripping a seedling is kept elevated in a hoisted state, until the transport speed of the transport mechanism 13 is decreased at a transport termination portion, thereby preventing the seedling from being affected by the posture due to contact with other seedlings during the transport of the seedling concerned. Further, the hoisting tool 24 is lowered to a position lower than the cutter mechanism 23 at the same time with a decrease in transport speed of the transport mechanism 13, so as not to cause any interference in a seedling delivery travel.

Further, the transport mechanism 13 is constituted in such a way that seedlings covering one array of cells 6 in the tray 7 on the seedling transfer belt 11 can be controlled for the lateral position by using the grip hand 12 on either side of the grafted seedling producing apparatus 10 in a range across the seedling transfer belt 11 to the retaining mechanism 15, and in order to take out seedlings (the seedlings inside one array of the cells 6 from side to side in the tray 7) from the retaining mechanism 15, the grip hand 12 supplies the seedlings to the retaining mechanism 15, and thereafter it moves gradually and laterally to a lateral position of the seedlings to be taken out subsequently (the cell 6 at which seedlings are available).

Figure 6:
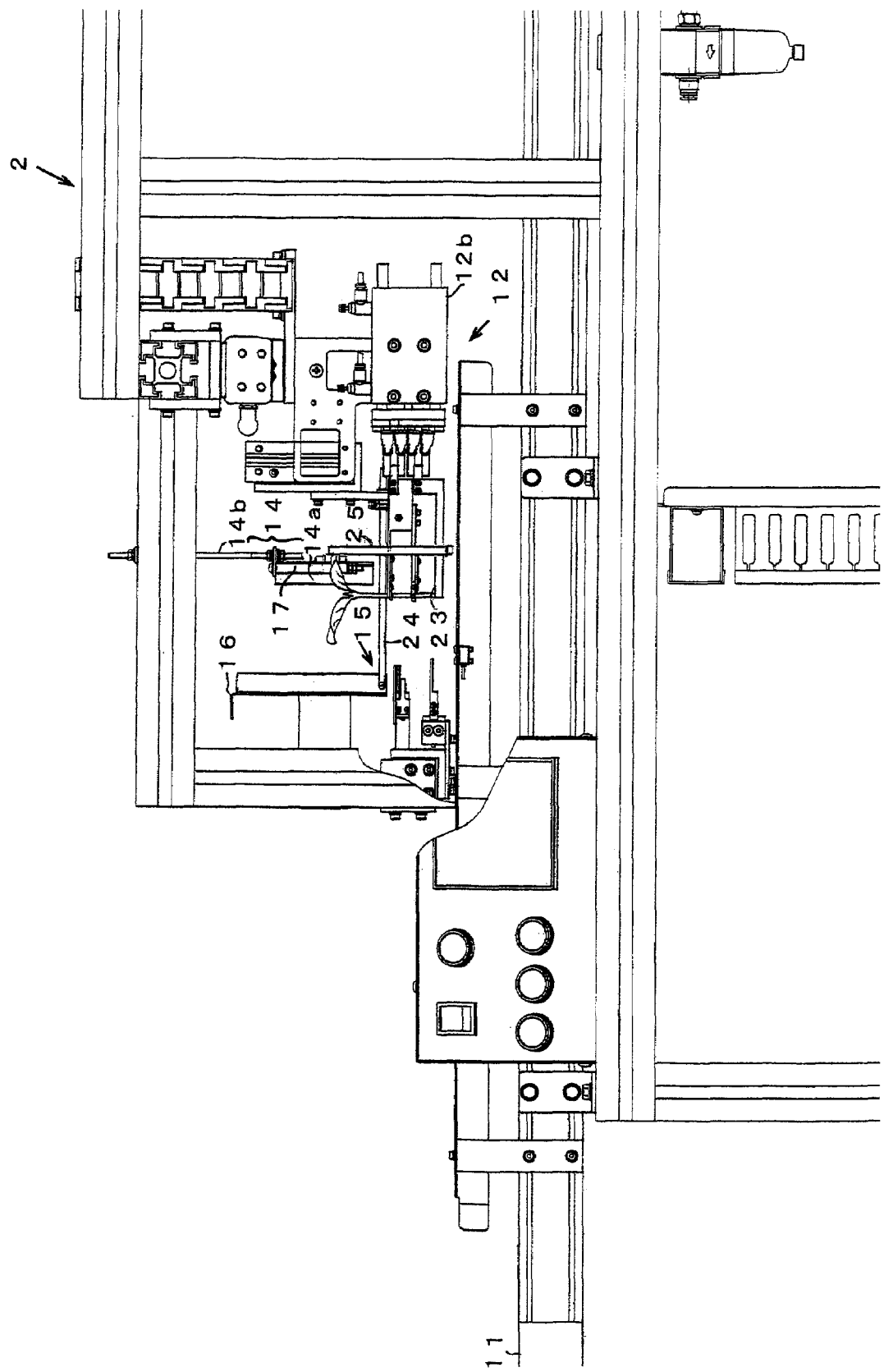
FIG. 6 is a side view illustrating major parts of the grafted seedling producing apparatus in FIG. 1, when viewed from the scion loading portion.

An alignment guide 14 is disposed downwardly in such a way as to interfere with the transport travel of seedlings by the transport mechanism 13 (refer to FIG. 6). The alignment guide 14 is disposed at a position immediately in front of the termination on the left-to-right transport channels of the transport mechanism 13 or at a position slightly closer to the seedling transfer belt 11 from a position opposing the retaining mechanism 15. A vertical-axis roller 17 is also disposed in front of the alignment guide 14. Further, a main alignment member 16, which acts as an alignment member disposed at a site opposing the alignment guide 14, is composed of a plate material having a triangular horizontal cross-section in which the plate flat surface is disposed in a vertical direction.

As described above, the retaining mechanism 15 is provided with the main alignment member 16 which regulates a direction to which the seedling leaf spreads in retaining scion seedlings W received from the grip hand 12. An alignment retaining device is constituted with the retaining mechanism 15 and the main alignment member 16.

An alignment guide 14 exclusively composed of a plate material has been conventionally used. However, in this instance, where seedlings having large leaves and a long stem are supplied to an area where the alignment guide 14 is installed, the large leaf is swung at a high position due to the rotation of the alignment guide 14, thus resulting in a spoiled alignment of seedlings.

However, according to the present embodiment, even in the case of seedlings having large leaves, as illustrated in FIG. 4, the seedlings are at first rotated in an alignment direction by the roller 17 and the rotation of the seedlings is then halted by the alignment guide 14 to align them appropriately.

Further, as illustrated in FIG. 6 which is a side view of a part at which the grip hand 12 advances into the alignment guide 14 and the retaining mechanism 15, the alignment guide 14 is composed of a plate material 14a having and a triangular horizontal cross section at which the plate flat face is disposed in a vertical direction and a rod-shaped guide 14b mounted above the plate material 14a and disposed in a vertical direction. Therefore, according to the present embodiment, in handling seedlings having large leaves, the leaf is brought into contact with the rod-shaped guide 14b mounted above the plate material 14a, appropriately inducing the rotation of the leaf, by which the seedlings can be successfully delivered to the retaining mechanism 15.

Figure 7:
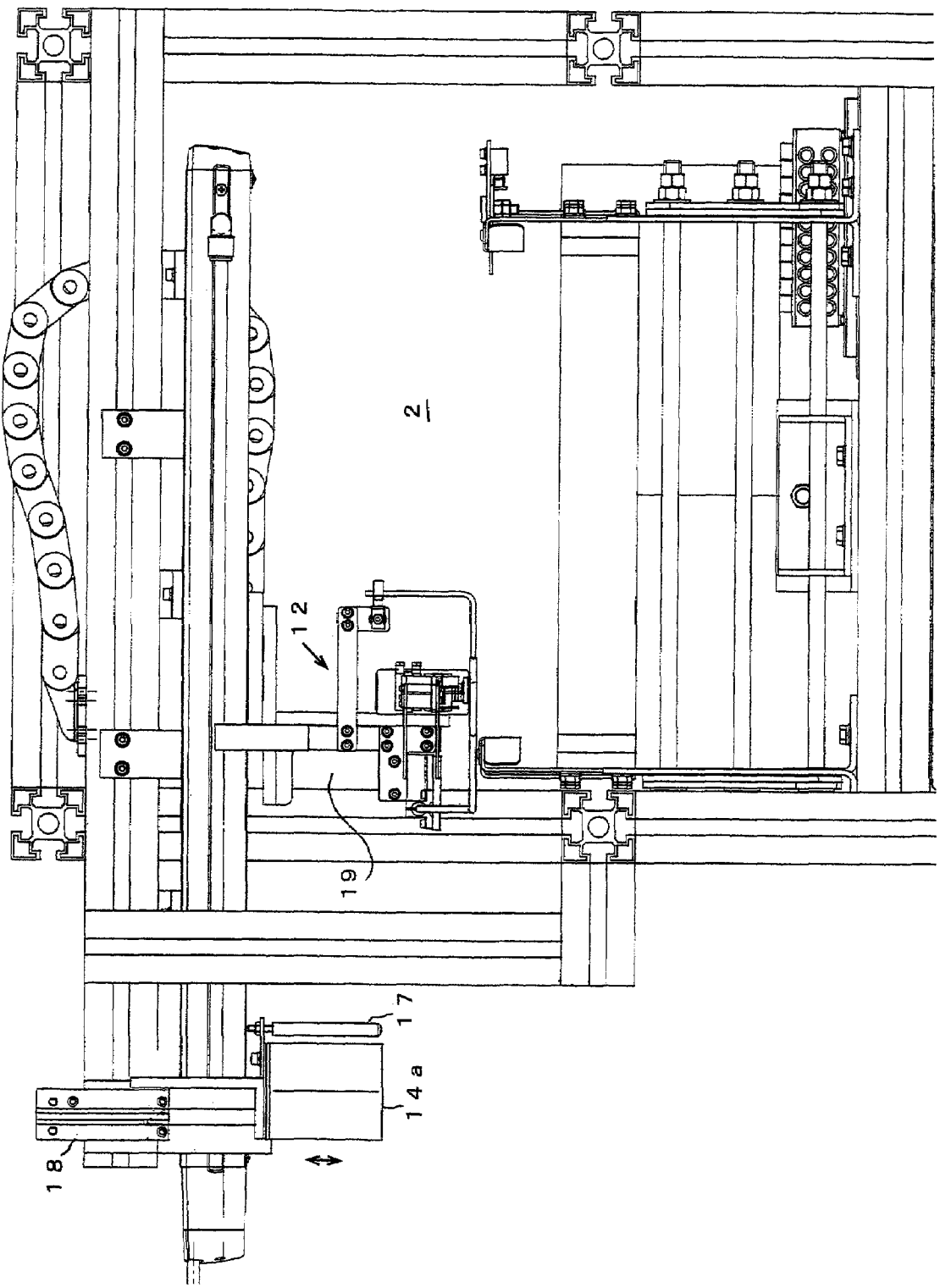
FIG. 7 is a front view illustrating the scion loading portion in another embodiment of the grafted seedling producing apparatus of the present invention.

Further, as illustrated in FIG. 7 which is a side view of the grip hand 12 and the alignment guide 14 of a grafted seedling producing apparatus 10 in another embodiment of the present invention, the alignment guide 14 is constituted so as to be lifted up from the ceiling portion and hung down freely.

In the above constitution, when seedlings are brought into contact with the alignment guide 14 to control the seedling-leaf direction immediately before the seedlings are delivered to the grafted seedling producing apparatus 10, the alignment guide 14 can be moved up and down by using a cylinder 18. Therefore, no damage to the seedlings or deviation in the seedling-leaf direction, as a result of the size or strength (flexibility) of the seedlings, due to interference with the alignment guide 14 is caused. Thereby, the seedlings can be transferred and delivered at the shortest distance and at the greatest speed to provide the grafted seedling producing apparatus 10 highly applicable to seedlings.

Figure 9:
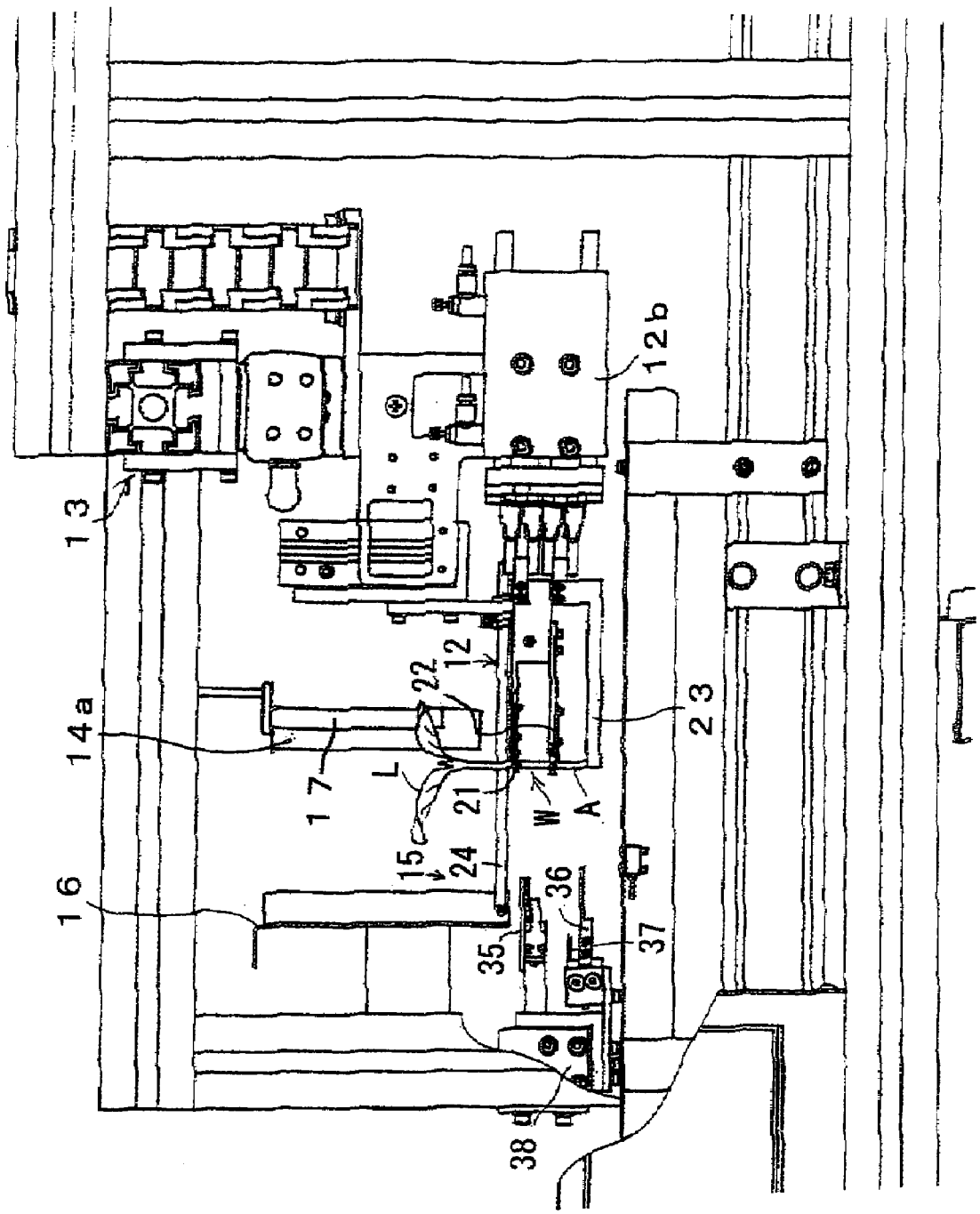
FIG. 9 is a side view illustrating enlarged major parts of the grafted seedling producing apparatus in FIG. 1.
Figure 10:
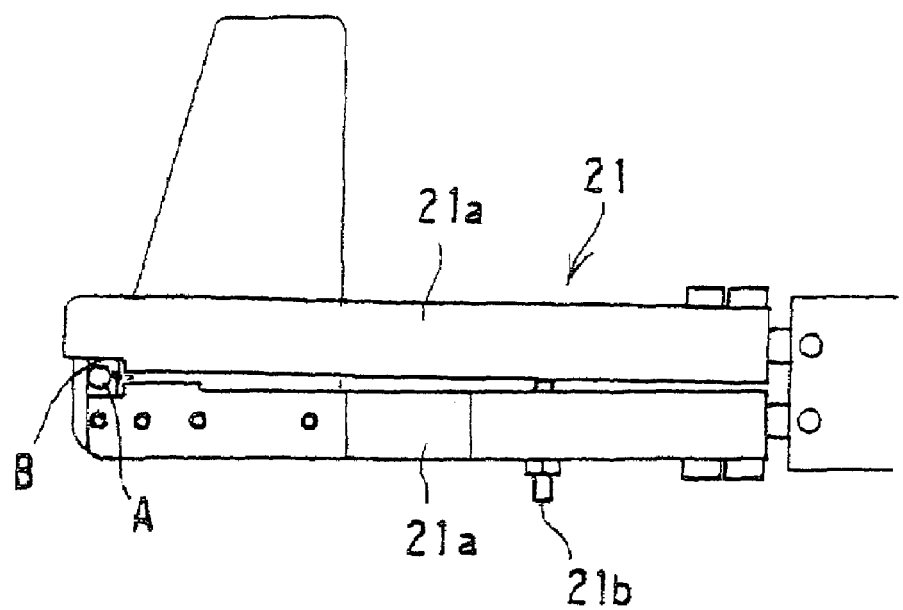
FIG. 10 is a plan view of a hand mechanism illustrating a grip state at the upper section of the grip hand of the grafted seedling producing apparatus in FIG. 1.
Figure 11:
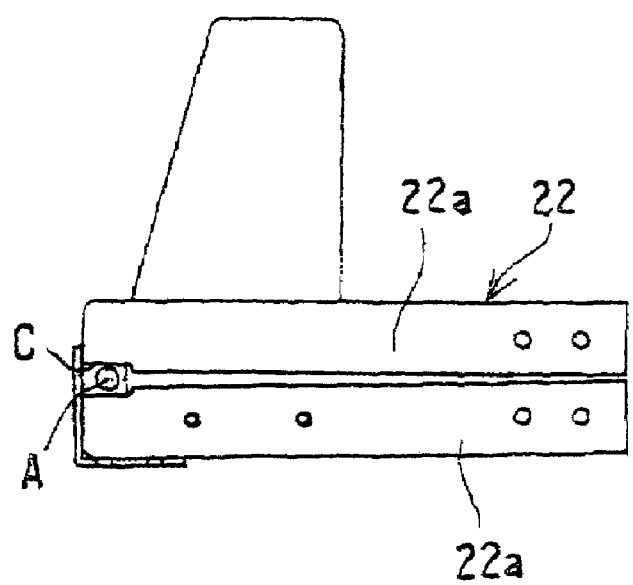
FIG. 11 is a plan view of a hand mechanism illustrating a grip state by the middle section of the grip hand of the grafted seedling producing apparatus in FIG. 1.
Figure 12:
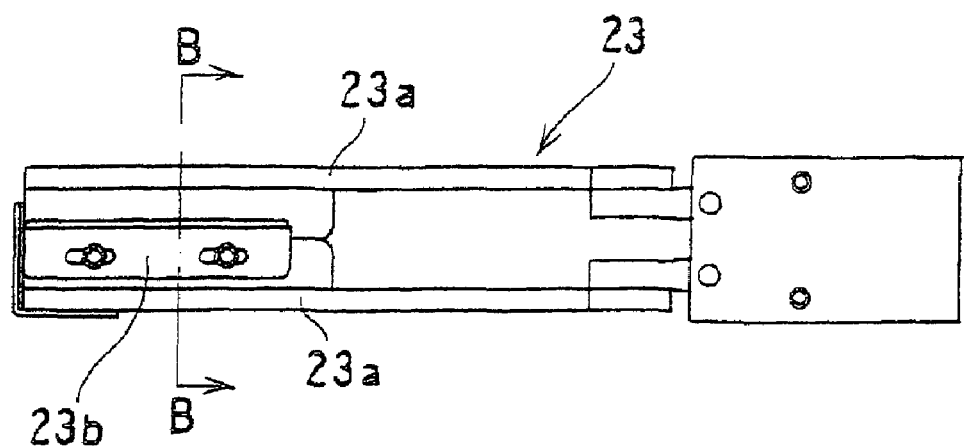
FIG. 12 is a plan view illustrating an operational state of the cutter mechanism of the grip hand of the grafted seedling producing apparatus in FIG. 1.
Figure 13:
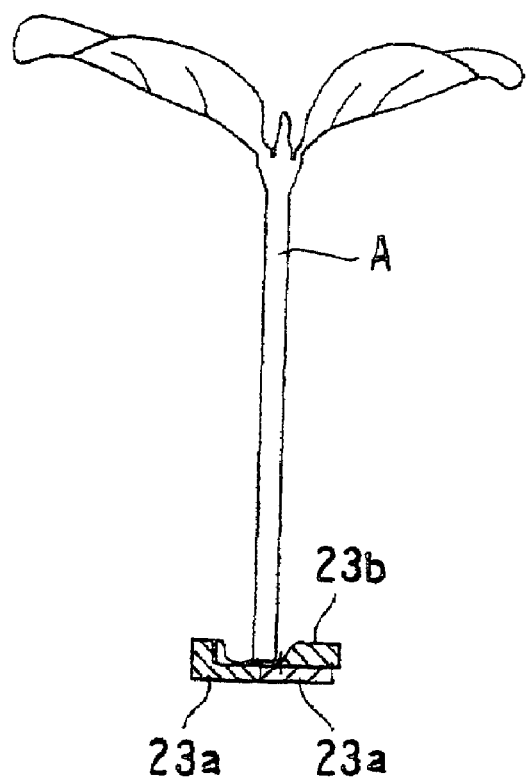
FIG. 13 is a sectional view taken along line of B to B in FIG. 12.

Next, a description will be made for a grip hand 12 at the scion loading portion 2 of the grafted seedling producing apparatus 10 in FIG. 1 and FIG. 2 by referring to a side view covering major parts of the cylinder in FIG. 9, a plan view of a hand mechanism 21 illustrating a grip state at the upper section of the grip hand 12 of the grafted seedling producing apparatus in FIG. 10 and a plan view of a hand mechanism 22 illustrating a grip state by the middle section of the grip hand 12 of the grafted seedling producing apparatus in FIG. 11 and a plan view illustrating an operational state of the cutter mechanism 23 of the grip hand 12 of the grafted seedling producing apparatus in FIG. 12 and a sectional view taken along line of B to B in FIG. 12 in FIG. 13.

The grip hand 12 is composed of an upper hand mechanism 21 for gripping the upper section of stem A of scion seedling W, a middle hand mechanism 22 for gripping the middle section thereof and a cutter mechanism 23 mounted therebelow for cutting the lower section stem A of scion seedling W by the opening/closing motion, and these three mechanisms are allowed to move back and forth in an integrated manner by a back and forth moving mechanism 12b. The grip hand 12 is also provided on the side with a hoisting tool 24 capable of moving up and down independently. Further, a rod-shaped stopper 25 as a detent (refer to FIG. 5) is installed upright from the cutter mechanism 23 at a position interfering with a seedling leaf L in the vicinity of the thus gripped stem A As in FIG. 10 which is a plan view illustrating a grip state of a scion seedling W, the upper hand mechanism 21 is constituted in such a way that a notch B is formed laterally in a dimension larger than the diameter of the stem A of the scion seedling W at a gripping position at the leading end of grabbing arms 21a, 21a from left to right to rotate freely and retain the stem A of the scion seedling W. It is provided with an adjustment bolt 21b for adjusting the clearance. As in FIG. 11 which is a plan view illustrating the grip state, the middle hand mechanism 22 is constituted in such a way that a notch C is formed anteroposterioly in a dimension larger than the diameter of the stem A of the scion seedling W at a gripping position at the leading end of grabbing arms 22a and 22a, from left to right to rotate freely and retain the stem A of the scion seedling W. The scion seedling W can be gripped exactly at a target position and also gripped so as to be rotated at the center axis of the stem by these hand mechanisms 21 and 22.

As given in a plan view (FIG. 12) illustrating an operation state of the cutter mechanism 23 and in a sectional view (FIG. 13) taken along line B to B, a blade 23b for cutting the stem A of scion seedling W is formed at the leading end portion of the left-to-right grabbing arms 23a and 23a, and also the outer brim is formed high so as to restrict the movement of the stem A after cutting.

The above-described hand mechanisms 21 and 22 and the cutter mechanism 23 constitute a grip mechanism for cutting the root of the scion seedling W as a scion and also gripping softly the stem so as to allow the rotation of the stem of the scion seedling W.

Figure 14:
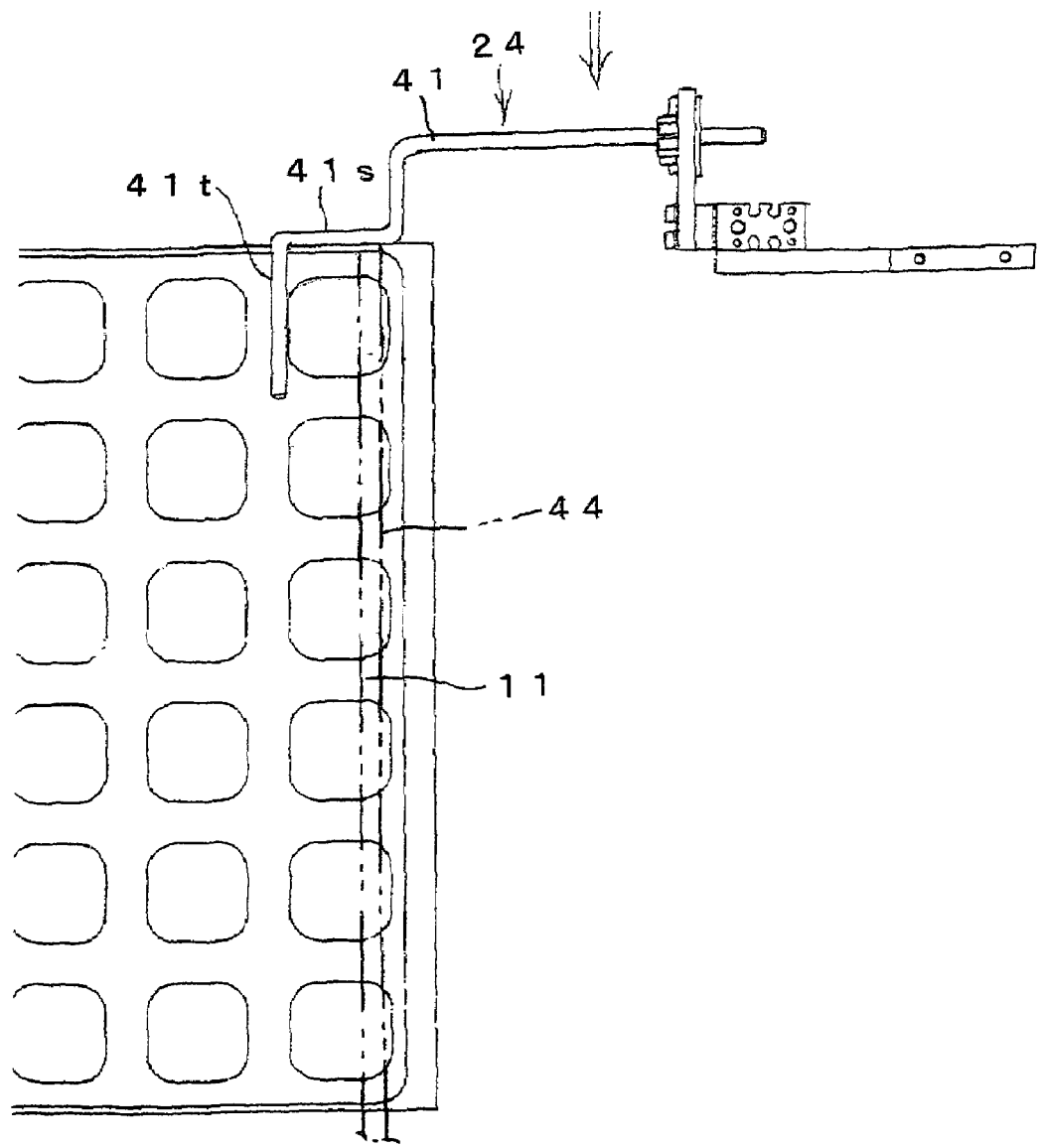
FIG. 14 is a plan view illustrating a motion of a first hoisting tool of the grip hand of the grafted seedling producing apparatus in FIG. 1.
Figure 15:
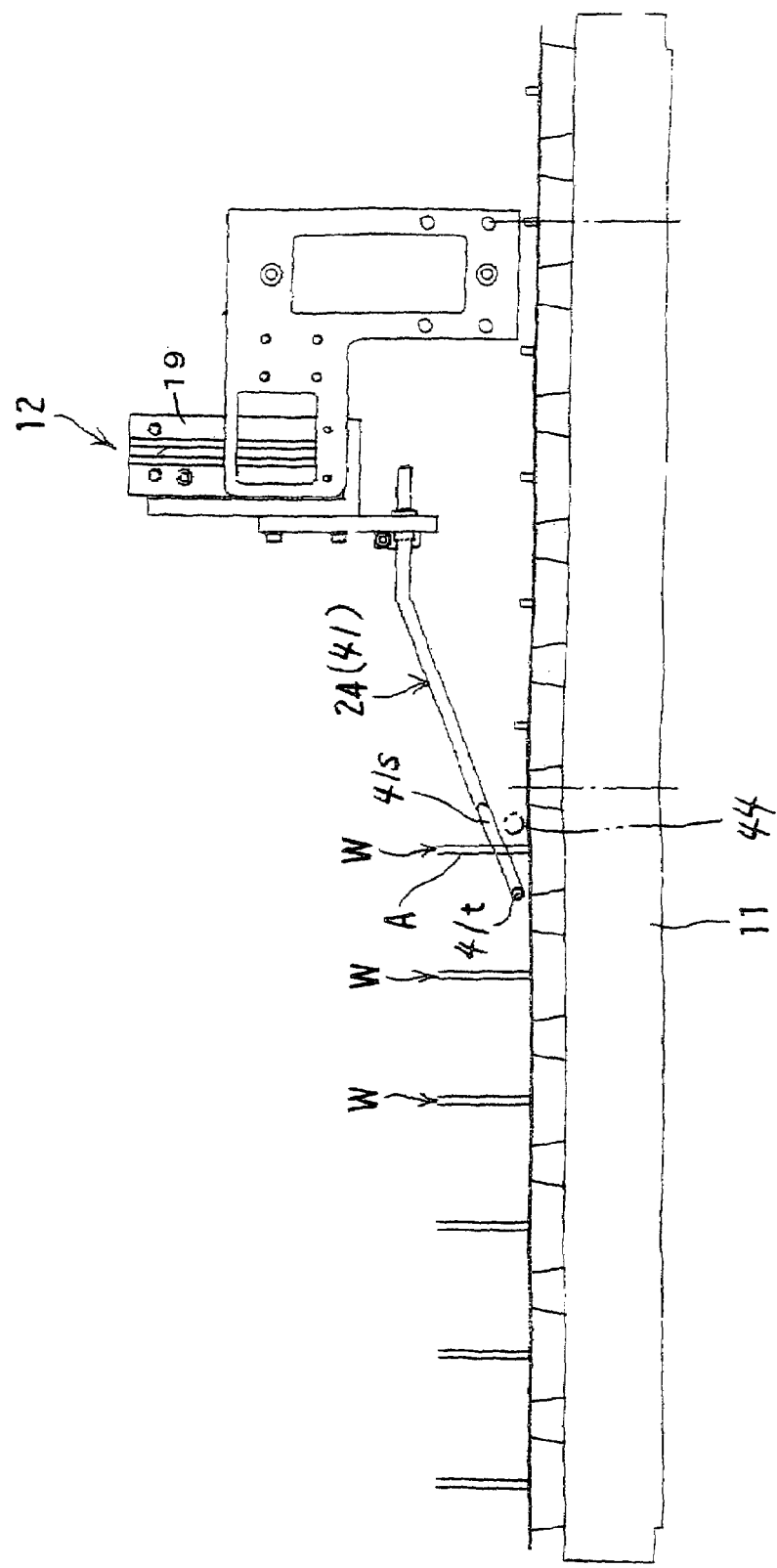
FIG. 15 is a side view illustrating a motion of the first hoisting tool of the grip hand of the grafted seedling producing apparatus in FIG. 1.
Figure 17:
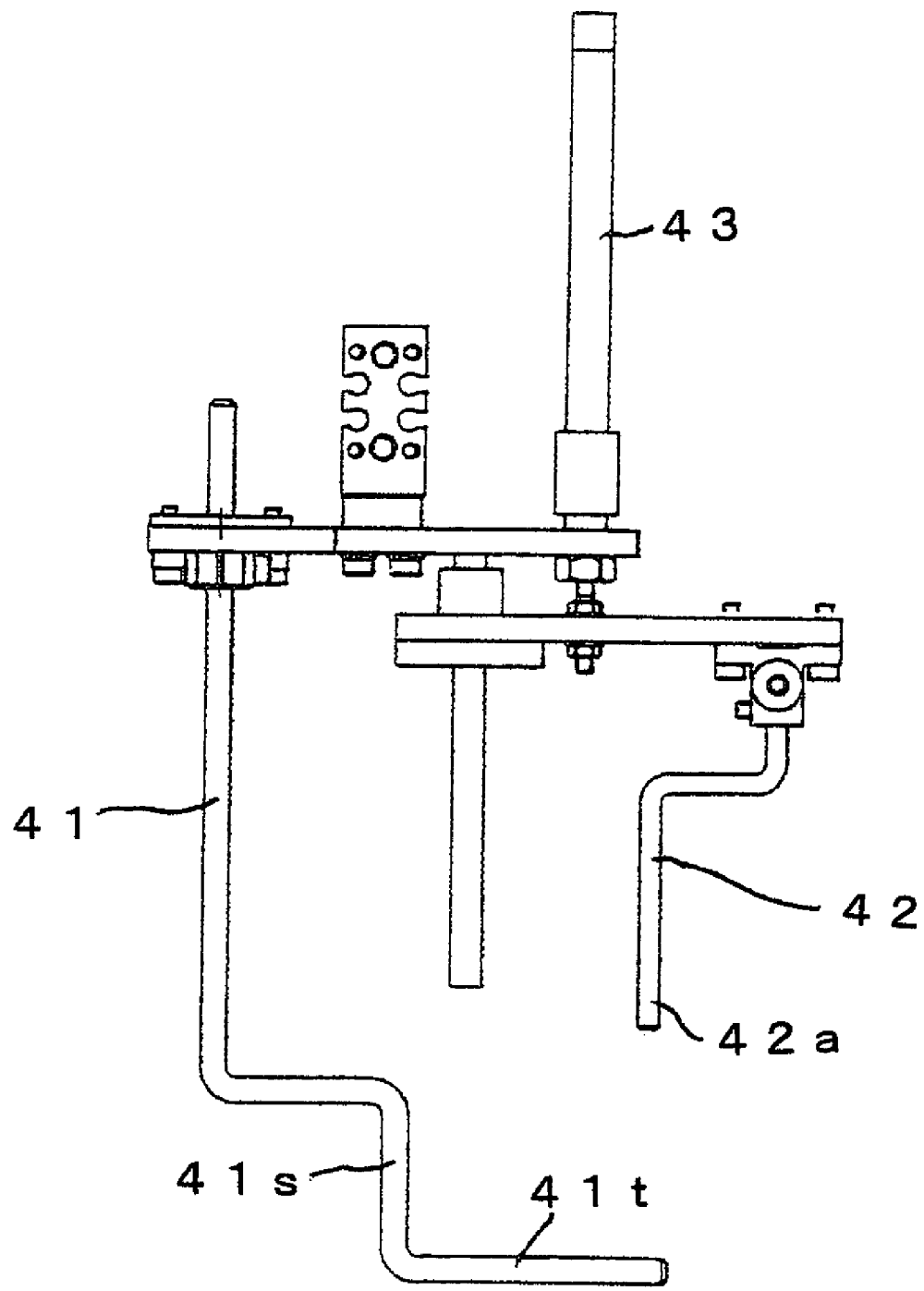
FIG. 17 is a plan view illustrating the first and second hoisting tools of the grip hand of the grafted seedling producing apparatus in FIG. 1.

Further, as given in a plan view (FIG. 14), a side view (FIG. 15), a front view illustrating the rising motion of a seedling W (FIG. 16) and a plan view of the hoisting tool (FIG. 17), the hoisting tool 24 mounted on hand grip 12 and moved up and down by using vertical movement device 19 is provided with a first hoisting tool 41 and a second hoisting tool 42. The first hoisting tool 41 is constituted with a rod tilted down forward to the root of a scion seedling W in which the leading end portion 41t is bent so as to reach behind from the side of the retaining mechanism 15, that is, the side of the scion seedling W, to which the grip hand 12 is moved laterally for taking out seedlings. A side portion 41s and a leading end portion 41t on the base of the side portion 41s in a winding manner are provided approximately at a right angle. Thereby, as in FIG. 16, which is a front view illustrating the rising motion, the stem A which is inclined by the elevating motion of the first hoisting tool 41 can be erected. A support portion 41b of the first hoisting tool 41 is constituted so as to be adjusted for the back and forth position and the height according to the positional relationship with scion seedlings W.

Further, the second hoisting tool 42 is provided on the side which is bilaterally opposite to the first hoisting tool 41 with respect to scion seedlings W. The second hoisting tool 42 is constituted with a rod which is bent so as to be positioned on the side of seedlings on which the grip hand 12 moves laterally for taking out the seedlings on the opposite side to the retaining mechanism 15 and provided so as to be moved back and forth by a back and forth moving cylinder 43. The leading end portion 42a of the second hoisting tool 42 positioned on the side of seedlings is horizontal, as with the leading end portion 41t of the first hoisting tool 41, and provided so as to be positioned slightly higher than the leading end portion 41t of the first hoisting tool 41 and also intersected when viewed above in a further projected state than the back and forth moving cylinder 43.

As a result, the second hoisting tool 42 is moved upward in association with the elevating motion of the first hoisting tool 41, making it possible to hoist seedlings from both sides of the seedlings and also from backward and erect them, by which the grip hand 12 can be used to grip appropriately scion seedlings W. In particular, in a tray 7 having a narrow pitch of the cell 6, such a case can be prevented by the second hoisting tool 42 that a seedling is inclined toward an adjacent seedling on the side to which the grip hand 12 is moved laterally and the inclined seedling is gripped by the grip hand 12 and transported as it is. Such a case can also be prevented that a seedling is entangled to an adjacent seedling and transported as it is by the grip hand 12 to result in an improper gripping posture of the seedling.

Further, such a constitution is provided that the first hoisting tool 41 is moved up and down, by which the other hoisting tool 42 is also moved up and down. Therefore, they can be moved up and down in a simple manner. Still further, the second hoisting tool 42 is bent in such a way that a halfway portion is projected toward the grip hand 12 (the side move away from an adjacent seedling) in a plan view. Thus, the grip hand 12 can be opened or closed at a predetermined level so as not to interfere with the second hoisting tool 42 and the second hoisting tool 42 is less likely to interfere with an adjacent seedling so that seedlings can be taken out smoothly.

Figure 8:
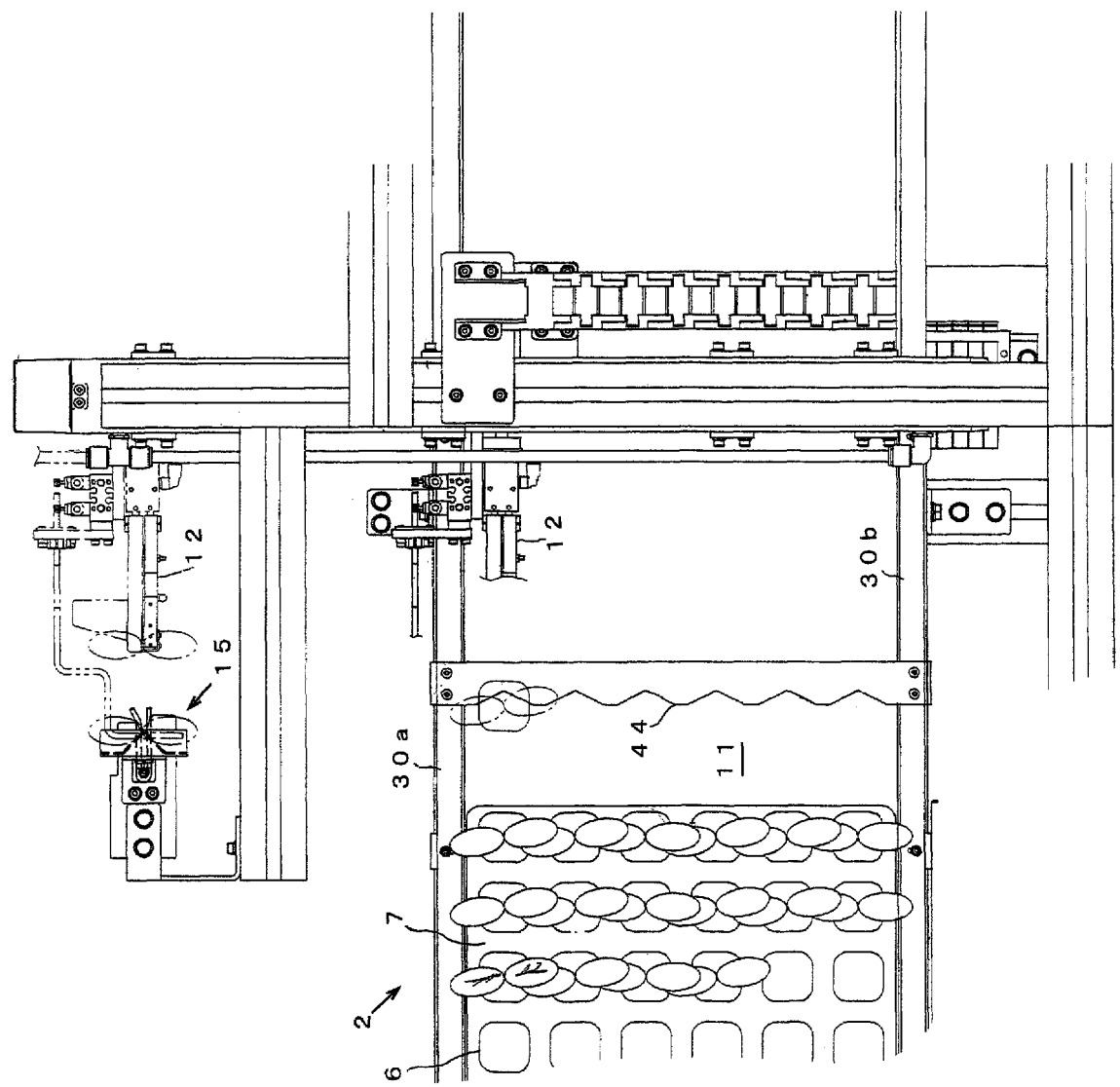
FIG. 8 is a plan view illustrating a whole structure of the grafted seedling producing apparatus in FIG. 1, when viewed from the scion loading portion of the grafted seedling producing apparatus.

Since the second hoisting tool 24 is constituted so as to hoist seedlings in three directions, it is impossible to erect seedlings which are inclined in the remaining one direction (to the side of the grip hand 12). Therefore, as in FIG. 8 which is a plan view of the scion loading portion 2, an inclination regulating tool 44 composed of a spring-functioning thin plate having a V-shaped groove along the width of the tray 7 from left to right may be provided above the tray 7 on the seedling transfer belt 11.

When both ends of the inclination regulating tool 44 are fixed to support walls 30a and 30b on both sides of a support plate 30 of the seedling transfer belt 11, seedlings inside a cell 6 are brought into contact with the inclination regulating tool 44 to make the soil inside the cell 6 irregular or cause a resistance in transporting the tray 7 by the seedling transfer belt 11. In order to prevent such events, one end of the inclination regulating tool 44 is fixed only to the support wall 30a of the support plate 30 and the other end thereof is not fixed to the support wall 30b but kept free, by which seedlings are allowed to pass through the inclination regulating tool 44.

Either end of the inclination regulating tool 44 is not fixed to the support wall 30b but kept free, by which seedlings are allowed to pass through even if they are cut to be hard and large. Thus, the work can be performed smoothly.

Regarding the loading motion of scion seedlings W by the above-constituted grip hand 12, at first, the upper hand mechanism 21, the middle hand mechanism 22 and the cutter mechanism 23 are prepared to keep open at a backward moving position, then, the transport mechanism 13 is moved horizontally toward the outside of the grafted seedling producing apparatus 10, by which the leading end portion 41t of the first hoisting tool 41 is inserted into the backward position of scion seedlings W from the side of scion seedlings W on the seedling carry-in mechanism 11, thereafter, a back and forth moving cylinder 43 is extended, the second hoisting tool 42 is projected forward so that the leading end portion is positioned on the side of seedlings, when viewed above, and also intersected with the leading end portion 41t of the first hoisting tool 41, thereby the elevating motion of the first hoisting tool 41 and the second hoisting tool 42 are moved upward to correct the inclination of scion seedlings W.

It is noted that the hoisting tool 24 is positioned approximately at the same height as a cutter mechanism 23 before the elevating motion. Thereby, the cutter mechanism 23 can be brought closer to the upper face of a cell 6, and the cutter mechanism 23 is able to cut the roots of seedlings. Thus, even seedlings having a short stem which are grown in the winter can be taken out correctly by using the hand mechanisms 21 and 22.

Subsequently, the hand mechanisms 21 and 22 and the cutter mechanism 23 are moved forward and both the hand mechanisms 21 and 22 are then closed, by which the stems A of scion seedlings W are retained at notches B and C on the leading ends of the hand mechanisms 21 and 22 so as to move rotationally. Thereafter, the cutter mechanism 23 is closed, by which the lower section of the stem A is cut and the scion seedling W is supported at the lower end by the cutter mechanism 23 so as to move rotationally.

In this instance, the hand mechanisms 21 and 22 and the cutter mechanism 23 are moved backward and then moved horizontally toward the center of the grafted seedling producing apparatus 10, by which scion seedlings W can be individually loaded from the seedling carry-in mechanism 11. It is noted that the backward moving distance of the hand mechanisms 21 and 22 and the cutter mechanism 23, that is, the back and forth moving stroke by a back and forth moving mechanism 12b is set to be long enough so that seedlings to be gripped and taken out from the tray 7 during the travel will not interfere with an adjacent seedling at all.

Figure 18:
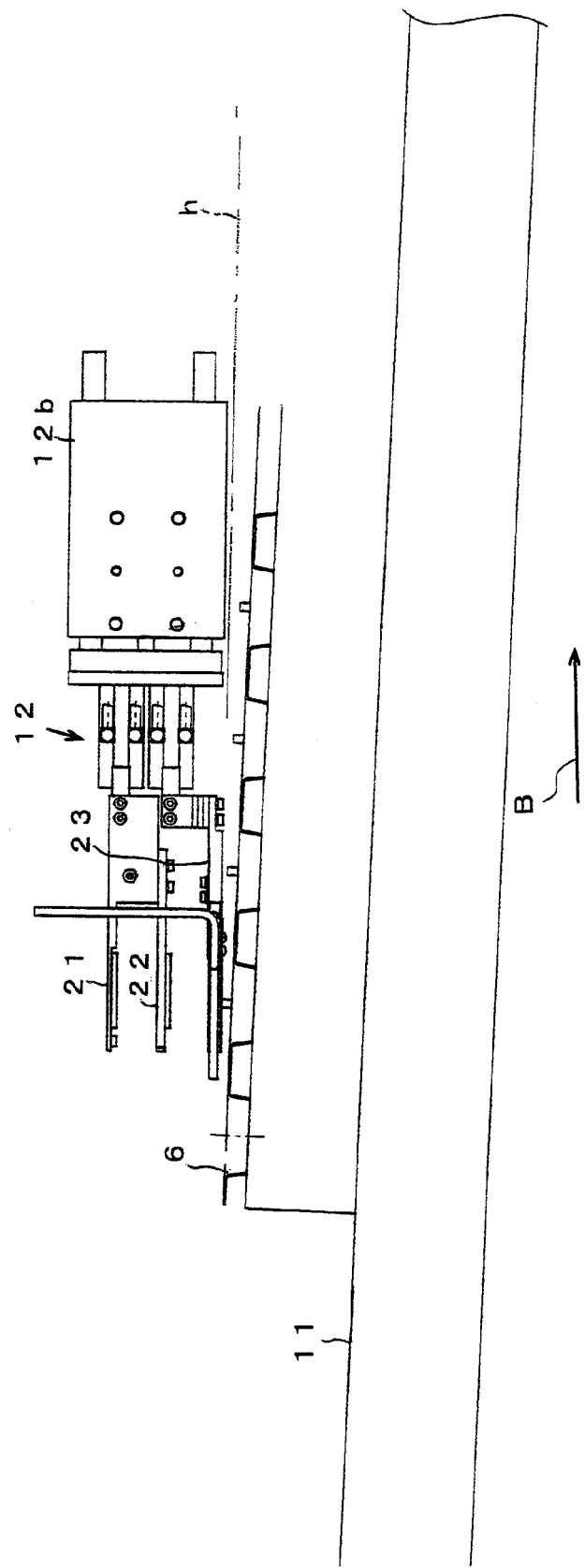
FIG. 18 is a side view illustrating major parts of the scion loading portion of the grip hand of the grafted seedling producing apparatus in FIG. 1.
Figure 19:
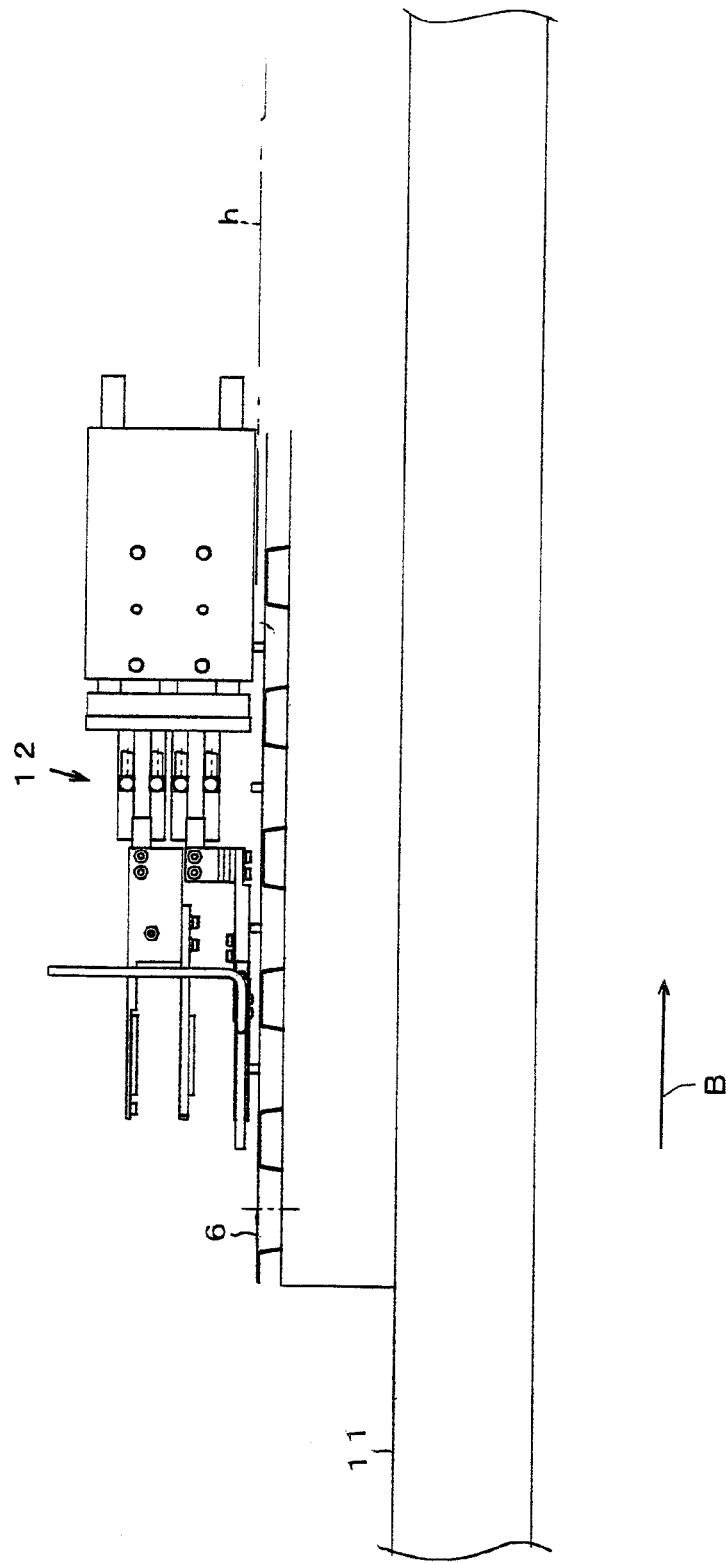
FIG. 19 is a side view illustrating major parts of a conventional scion loading portion.

In the present embodiment, as in FIG. 18 which is a side view illustrating major parts of the scion loading portion 2, in order to prevent such an event that a seedling is not cut satisfactorily to remain at a prior step, the seedling transfer belt 11 is tilted so that the portion in the forward moving direction (the direction given by the arrow B) is lower than a horizontal posture (a horizontal plain h). On the contrary, as in FIG. 19 which is a side view illustrating major parts of a conventional scion loading portion 2, the conventional seedling transfer belt 11 is set so that the belt face is parallel with a horizontal plane h. In this instance, a seedling cut at a prior step (remains of the thus cut seedling) is entangled with the cutter mechanism 23 or a side roller to result in a mechanical jam.

In the present embodiment, the seedling transfer belt 11 is tilted so that the portion thereof in the forward moving direction is kept lower than a horizontal plane h, thus making it possible to prevent seedlings from being entangled thereto.

Further, regarding the transport travel to the direction given by the arrow D in FIG. 4 by the transport mechanism 13, as in FIG. 4 which is a plan view illustrating a direction-correcting motion, when the grip hand 12 which grips a scion seedling W moves horizontally from a grip position (O) (grip position (Q) in FIG. 4 indicates a position moved backward by a back and forth mechanism 12b) to a delivery position (R), the grip hand passes in the vicinity of an alignment guide 14 (FIG. 6) disposed so as to interfere with the transport travel. Thereby, when a direction to which the seedling leaf of scion seedling W spreads is greatly inclined toward the transport direction, the seedling leaf interferes with the alignment guide 14 to rotationally move scion seedlings W so that a direction to which the seedling leaf spreads is uniformly arranged substantially toward the transport direction.

In this instance, even when a scion seedling W is moved rotationally to an excessive extent, the seedling leaf of the seedling is brought into contact with a rod-shaped member 14b (FIG. 6) of the alignment guide 14 which acts as an alignment member provided at a position opposite to the retaining mechanism 15 and constituted to be a flat plate in an angular manner, thereby regulating a range of the rotational movement. Therefore, the stem A and the seedling leaf of the seedling transported by a transport mechanism 13 are directly brought into contact with the rod-shaped member 14b, thereby making it possible to prevent an improper posture of seedlings or a wrong direction to which the seedling leaf spreads. The position can be adjusted depending on the dimension and type of seedlings.

The transport device 13 is constituted so as to be moved by an electrical slider. More particularly, when a stroke sensor (not illustrated) of the electrical slider detects that the grip hand 12 is kept away from above the tray 7 on the seedling carry-in mechanism 11 and has arrived at an position immediately in front of the alignment guide 14, the electrical slider is decreased in speed and seedlings are transported at a low speed on the termination of the transport process. The transport speed is decreased at the same position, irrespective of whether seedlings are taken out from the transport starting end on the right or that on the left (cell 6 in which seedlings are available).

Next, a description will be made for an alignment retaining device composed of a retaining mechanism 15 and an alignment member provided at the delivery position R.

The retaining mechanism 15 is disposed in opposition to an advancing grip hand 12 so as to receive scion seedlings W at an advanced position of the grip hand 12.

Figure 20:
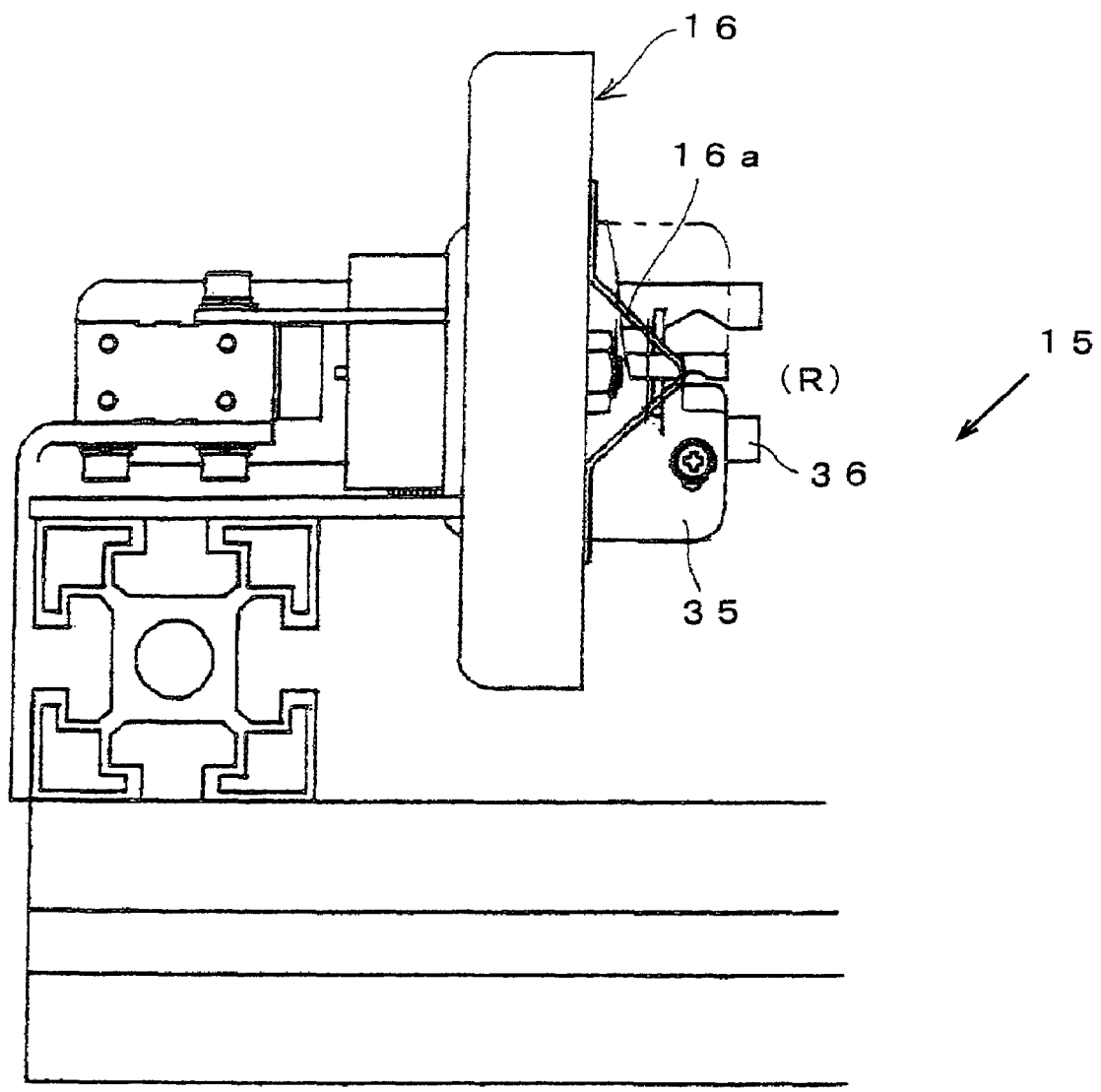
FIG. 20 is a plan view illustrating major parts of an alignment retaining device of the grafted seedling producing apparatus in FIG. 1.
Figure 21:
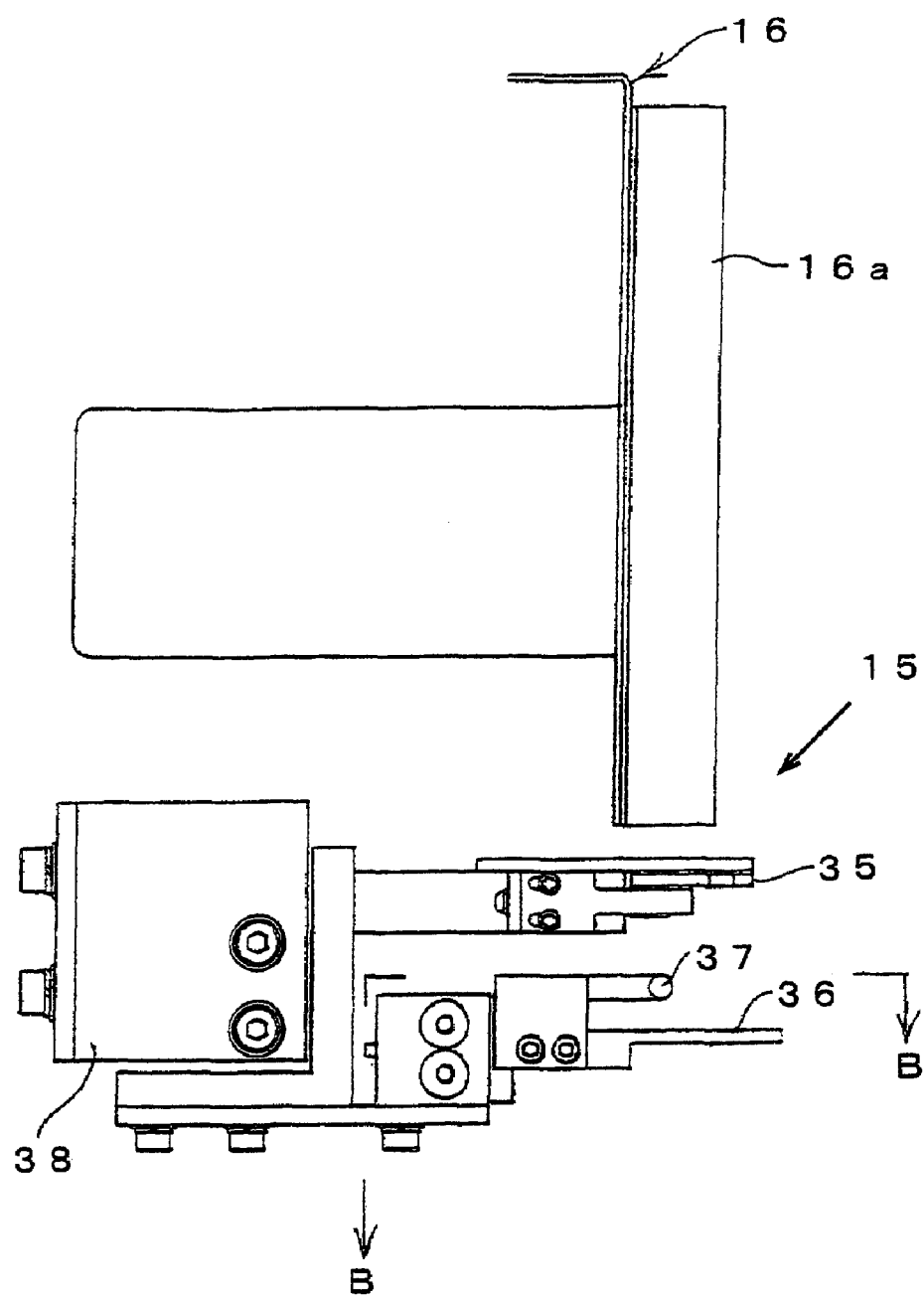
FIG. 21 is a side view illustrating major parts of the alignment retaining device of the grafted seedling producing apparatus in FIG. 1.
Figure 22:
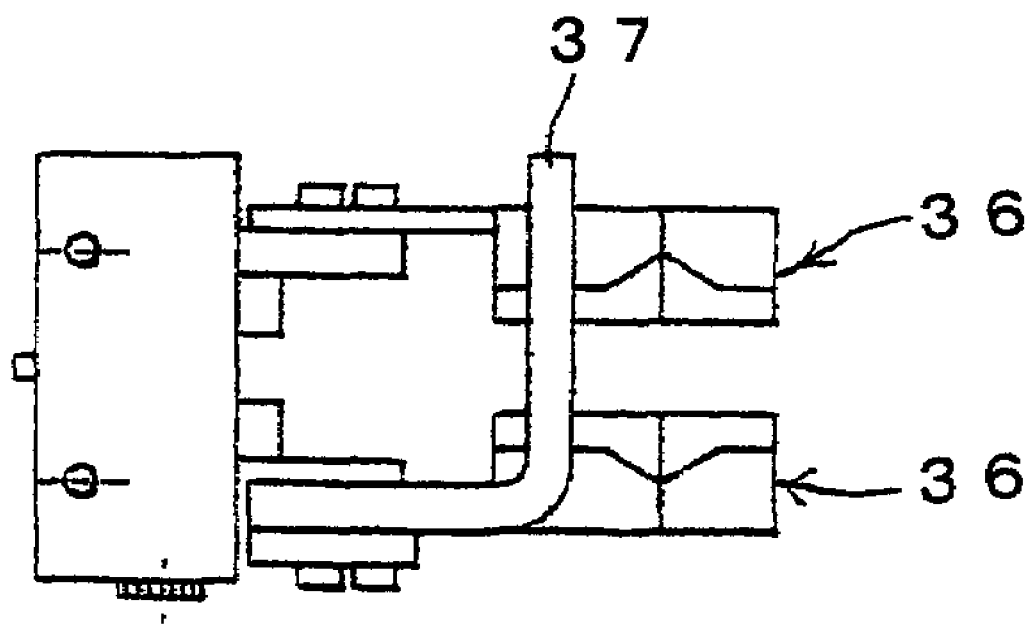
FIG. 22 is a sectional view taken along line of B to B in FIG. 21.

As in FIG. 20 (a plan view of major parts), FIG. 21 (a side view of major parts) and FIG. 22 (a sectional view taken along line B to B), the retaining mechanism 15 is provided at the delivery position R with an upper hand mechanism 35 for gripping the upper section of the stem A of the received scion seedling W, a middle hand mechanism 36 for gripping the middle section of the stem A therebelow, a stopper 37 for regulating an excessive advancement of the stem A at the height between the hand mechanisms 35 and 36, and an elevating mechanism 38 for adjusting the height of them in an integrated manner.

A main alignment member 16, which acts as an alignment member, is disposed at a position where the seedling leaf of scion seedling W is received above the retaining mechanism 15. The main alignment member 16 is a flat-plate member for regulating a direction to which a double seedling leaf spreads, having a guide portion 16a (refer to FIG. 4) as a projected streak extending up and down at the center position thereof. The guide portion 16a is provided with an angular cross section so that the seedling leaf of the received scion seedling W can be divided from side to side and formed to be smooth on the surface for reducing the friction.

Regarding the delivery motion of seedlings by the above-constituted main alignment member 16, when the grip hand 12 advances to deliver scion seedlings W to the retaining mechanism 15, seed leaves L and L of scion seedlings W are pressed toward the main alignment member 16 and also a pair of seed leaves L and L are divided side to side by the guide portion 16a, and a direction to which the seedling leaf spreads is aligned so as to come along the main alignment member 16.

A detailed description will be made for the above delivery motion. Scion seedlings W are loaded from a seedling carry-in mechanism 11, and a grip hand 12 which has gripped the stem thereof is positioned with respect to the front face of a retaining mechanism 15. Thereafter, at first, in a state that the grip hand 12 including a cutter mechanism 23 is closed, that is, in a state that a middle hand mechanism 22 is kept loose for the grip, with the lower end of the stem A being received on the cutter mechanism 23, a back and forth moving mechanism 12b is moved back and forth to reciprocate to a position of the retaining mechanism 15, by which a direction to which the seedling leaf spreads is aligned via a main alignment member 16.

Then, the cutter mechanism 23 is opened to receive the seedling leaf on a hand mechanism 21 of the grip hand 12, thereby adjusting the height of scion seedlings W. With this state kept, the back and forth moving mechanism 12b is moved back and forth to reciprocate to a position of the retaining mechanism 15. Thereby, the seedling leaf is brought into contact with the main alignment member 16 and a direction to which the seedling leaf spreads is aligned.

Since a similar rod-shaped member 14b of the alignment guide 14 is disposed oppositely at the backward moving position where, as described above, the grip hand 12 is reciprocated by the motion of the back and forth moving mechanism 12b, thereby, the main alignment member 16 at the advanced position of the grip hand 12 is also carried to the side of the grip hand 12, the seedling leaf of the seedlings is brought into contact with the main alignment member 16 two times for one reciprocal stroke of the grip hand 12. Thus, seedlings can efficiently be aligned due to the back and forth movement.

The back and forth moving mechanism 12b is provided with a cylinder for back and forth movement, an expansion position sensor for detecting that the cylinder for back and forth movement is expanded up to a position where a seedling gripped by the grip hand 12 is brought into contact with the main alignment member 16, and a contraction position sensor for detecting that the seedling gripped by the grip hand 12 is brought into contact with the rod-shaped member 14b, that is, at a normal position where seedlings are transported by using the transport mechanism 13. Therefore, the cylinder for back and forth movement is expanded and contracted repeatedly so that the expansion position sensor and the contraction position sensor can make an alternate detection, by which the grip hand 12 is reciprocated.

After the alignment motion, the grip hand 12 is allowed to advance to the retaining mechanism 15 and then the cutter mechanism 23 is closed, by which the stem A is cut at a predetermined position to make the length uniform. In this instance, even where the stem A is bent, a stopper 37 mounted at the height between these hand mechanisms 35 and 36 regulates an excessive advancement of the stem A, thereby, making it possible to cut the stem A without fail.

After the stem A is cut, the cutter mechanism 23 is opened, and both hand mechanisms 35 and 36 of the retaining mechanism 15 which have received scion seedlings W are also closed. Then, hand mechanisms 21 and 22 at the top and the bottom of the grip hand 12 are opened, and a middle hand mechanism 36 of the retaining mechanism 15 on the receiving side is lowered to pull down a seedling so as to keep a predetermined height. Thereafter, the grip hand 12 is moved backward.

After completion of the delivery of seedlings, the grip hand 12 is returned to the seedling carry-in mechanism 11, by which a next scion seedling W can be loaded. A series of these motions are performed repeatedly, by which scion seedlings W are sequentially loaded from the seedling carry-in mechanism 11, and the grafting robot main body 10a can be used to perform grafting. It is noted that the during seedling deliver travel, the hoisting tool 24 is lowered below the cutter mechanism 23 so as not to interfere with the delivery of seedlings.

What is claimed is:

1. A grafted seedling producing apparatus comprising:
    loading portions which are provided with a seedling carry-in mechanism for sequentially transporting a tray of a large number of arranged seedlings, a grip hand for individually gripping stems of seedlings on the seedling carry-in mechanism, a cutter mechanism for individually cutting the stems of seedlings gripped by the grip hand, an alignment guide for aligning the seedlings to be transported by the grip hand, a roller for rotating seedlings in an alignment direction at the side of the seedling carry-in mechanism from the alignment guide, and a transport mechanism for moving the grip hand to the alignment guide;
    a retaining mechanism facing the alignment guide, and comprising an alignment member which regulates a direction to which the seedling leaf of a seedling gripped by the grip hand of the loading portions faces, and temporarily retains the seedling transported from the grip hand; and
    an attachment treatment portion for attaching seedlings delivered from the retaining mechanism.

2. The grafted seedling producing apparatus according to claim 1, the grip hand and the cutter mechanism are provided so as to move in the same direction as a transfer direction of the seedling carry-in mechanism in an integrated manner by a back and forth moving mechanism supported by the transport mechanism and are provided so as to be moved in a perpendicular direction to the transfer direction by the transport mechanism.

3. The grafted seedling producing apparatus according to claim 1, further comprising:
    a hoisting tool mounted on the hand grip, the hoisting tool is provided with a first hoisting tool, and a second hoisting tool on a side which is bilaterally opposite to the first hoisting tool with respect to scion seedlings so as to be moved back and forth by a back and forth moving cylinder and to be moved up and down by a vertical movement device.

4. The grafted seedling producing apparatus according to claim 3, the first hoisting tool comprising a rod tilted down forward to the root of a scion seedling in which a leading end portion is bent so as to reach behind from a side of the retaining mechanism to which the grip hand is moved laterally for taking out seedlings and a side portion provided on the base of the leading end portion in a winding manner are provided approximately at a right angle; and
    the second hoisting tool comprising a rod provided on a side which is bilaterally opposite to the first hoisting tool with respect to scion seedlings in which the leading end portion is bent so as to be positioned on the side of seedlings on which the grip hand moves laterally for taking out the seedlings on the opposite side to the retaining mechanism and is provided so as to be moved back and forth by a back and forth moving cylinder.

5. The grafted seedling producing apparatus according to claim 1, further comprising:
    an inclination regulating tool comprising a spring-functioning thin plate having a V-shaped groove along the width of the tray provided above the tray on the seedling carry-in mechanism, one end of the inclination regulating tool being fixed only to a support wall of a support plate which is provided to support the seedling carry-in mechanism and the other end of the inclination regulating tool being not fixed to the support wall but kept free.

6. The grafted seedling producing apparatus according to claim 1, the alignment guide comprising a plate material having a triangular horizontal cross section at which a plate flat face is disposed in a vertical direction and a rod-shaped guide mounted above the plate material and disposed in a vertical direction, wherein the plate material is located in the vicinity of the scion seedling transport path so as to regulate a range of the rotational movement of a scion seedling leaf transported by a transport mechanism and the rod-shaped guide is located in the area where the rod-shaped guide is directly brought into contact with the scion seedling leaf when the leaf moves rotationally to an excessive extent.

7. The grafted seedling producing apparatus according to claim 1, the seedling carry-in mechanism is tilted so that the portion in the forward moving direction is lower than a horizontal plane defined by the grip hand.

* * * * *